(12) United States Patent
Lachwani et al.

(10) Patent No.: US 10,098,026 B1
(45) Date of Patent: *Oct. 9, 2018

(54) APPLICATION TEST SYSTEM

(71) Applicant: HEADSPIN, INC., Mountain View, CA (US)

(72) Inventors: Manish Lachwani, Los Altos, CA (US); Brien Colwell, Oakland, CA (US); Marius Nita, San Francisco, CA (US)

(73) Assignee: HEADSPIN, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,105

(22) Filed: Apr. 21, 2017

Related U.S. Application Data

(63) Continuation of application No. 14/850,798, filed on Sep. 10, 2015, now Pat. No. 9,681,318.

(51) Int. Cl.
| | |
|---|---|
| *H04W 36/00* | (2009.01) |
| *H04W 24/08* | (2009.01) |
| *H04W 76/02* | (2009.01) |
| *H04W 8/18* | (2009.01) |
| *H04W 76/10* | (2018.01) |
| *H04W 88/18* | (2009.01) |

(52) U.S. Cl.
CPC .......... *H04W 24/08* (2013.01); *H04W 8/183* (2013.01); *H04W 76/02* (2013.01); *H04W 76/10* (2018.02); *H04W 88/182* (2013.01)

(58) Field of Classification Search
CPC ..... H04W 24/00; H04W 60/04; H04W 36/30; H04W 8/24; H04W 8/005; G06F 19/3418; G06F 19/3406; H04B 7/26; G01S 11/04

USPC .... 455/423, 426.1, 445, 435.1, 456.1, 67.11, 455/456.3; 342/461
See application file for complete search history.

(56) References Cited

U.S. PATENT DOCUMENTS

| | | |
|---|---|---|
| 8,175,538 B1 | 5/2012 | Chen et al. |
| 8,621,091 B1 | 12/2013 | Akalin et al. |

(Continued)

OTHER PUBLICATIONS

Doan, Phuoc Huu, "Advisory Action dated Jan. 9, 2017", U.S. Appl. No. 14/850,798, The United States Patent and Trademark Office, Jan. 9, 2017.

Doan, Phuoc Huu, "Final Office Action dated Nov. 4, 2016", U.S. Appl. No. 14/850,798, The United States Patent and Trademark Office, Nov. 4, 2016.

(Continued)

*Primary Examiner* — Phuoc H Doan
(74) *Attorney, Agent, or Firm* — Lindauer Law, PLLC

(57) ABSTRACT

Mobile devices executing applications utilize data services worldwide. Many failures or adverse user experiences of these applications have been determined to be the result of network issues. Testing of the applications for networking issues is facilitated by utilizing a test network having proxy devices placed at different physical locations. A tester may use the test network to direct traffic to and from an application under test to one of the proxy devices. Using the proxy device, the traffic is then exchanged with a real-world network, such as a cellular data network, at the different location. The tester may thus test operation of the application under test in real-world conditions at a variety of different physical locations. The results may be used to mitigate or eliminate the failures or adverse user experiences. Additional testing may also be performed on the application after deployment to end users.

19 Claims, 15 Drawing Sheets

(56) References Cited

U.S. PATENT DOCUMENTS

| | | |
|---|---|---|
| 9,356,883 B1 | 5/2016 | Borthakur |
| 9,660,895 B1* | 5/2017 | Bennett ................. H04L 43/50 |
| 2007/0055476 A1 | 3/2007 | Whisnant et al. |
| 2011/0090939 A1 | 4/2011 | Diener et al. |
| 2011/0151864 A1 | 6/2011 | Byun et al. |
| 2014/0113625 A1 | 4/2014 | Gruber et al. |
| 2015/0208258 A1* | 7/2015 | Brenzel ................. H04M 1/24 |
| | | 455/418 |
| 2015/0319048 A1 | 11/2015 | Griff et al. |
| 2016/0133231 A1 | 5/2016 | Liu et al. |
| 2016/0205720 A1 | 7/2016 | Mandanapu |
| 2016/0254967 A1 | 9/2016 | Brown et al. |
| 2016/0267930 A1 | 9/2016 | Chu |

OTHER PUBLICATIONS

Doan, Phuoc Huu, "Non Final Office Action dated Jun. 2, 2016", U.S. Appl. No. 14/850,798, The United States Patent and Trademark Office, Jun. 2, 2016.

Doan, Phuoc Huu, "Notice of Allowance dated Feb. 14, 2017", U.S. Appl. No. 14/850,798, The United States Patent and Trademark Office, Feb. 14, 2017.

Mehra, Inder P., "Non-final Office Action dated Jan. 3, 2017", U.S. Appl. No. 14/976,480, The United States Patent and Trademark Office, Jan. 3, 2017.

Mehra, Inder P., "Notice of Allowance dated May 5, 2017", U.S. Appl. No. 14/976,480, The United States Patent and Trademark Office, May 5, 2017.

* cited by examiner

APPLICATION TEST SYSTEM

PRIORITY

This application is a continuation of, and claims priority to, pending U.S. patent application Ser. No. 14/850,798 filed on Sep. 10, 2015, entitled "System for Application Test". The entirety of this previously filed application is hereby incorporated by reference.

BACKGROUND

Mobile devices executing applications that utilize data networks during operation may experience failures or otherwise produce adverse user experiences as a result of network conditions. Testing of these applications may be performed to prevent or mitigate the impacts of failures.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
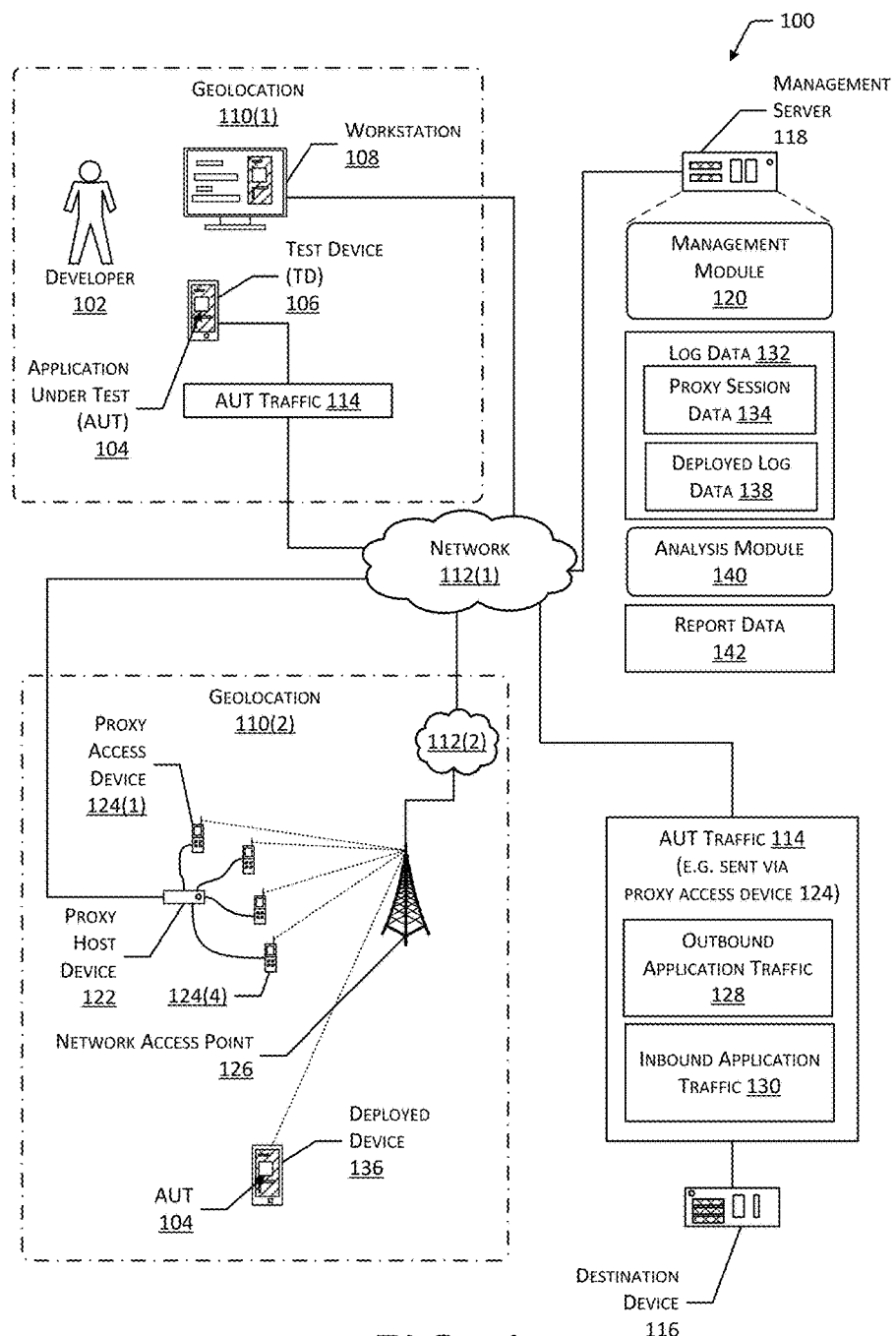
FIG. 1 depicts a system for testing applications that utilize network resources, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Mobile devices may execute an application to provide various functions. Mobile devices may include, but are not limited to, smartphones, laptops, tablet computers, embedded devices, wearable computing devices, appliances, automobiles, aircraft, and so forth. Functions provided by the application may involve retrieval of data, presentation of that data to a user, processing of data, and so forth.

Some applications may communicate with a destination device, such as a server, using a network. For example, a mapping application may send a mapping server information indicative of a position of the mobile device and receive map data to present on a display of the mobile device. Problems with this communication may result in the application failing to perform the desired function, error messages, improper operation, and so forth. Continuing the example above, a long latency or delay in receiving the map data may cause the application on the mobile device to present an error to the user. These problems may result in an adverse user experience. For example, the user may discontinue using the application because of these problems, and instead use another application.

Some problems that the application may encounter while using the network may not be immediately perceived by the user. For example, the application may drain the battery of the mobile device by excessively accessing the destination device, may consume more data than desired, and so forth.

The network used by the mobile device to access the destination device may include a wireless wide area network (WWAN), such as a wireless cellular data network (WCDN). For example, the mobile device may comprise a smartphone that accesses a WCDN provided by a telecommunication company. By using the WCDN, the smartphone is able to send and receive data to other devices, such as those accessible on the Internet.

Performance of the network used by the mobile device executing the application may be variable due to many factors. These factors may include the geographic location (geolocation) of where the mobile device is located while communicating with the network, the network access point in use, congestion at the network access point, congestion at the interconnect that connects the WCDN to the Internet, capability of the network access point, and so forth. For example, during a morning commute, many users may be streaming video entertainment content to their mobile devices, resulting in overall network congestion. In another example, the telecommunication company may have some network access points that support 3G data transmission while other network access points are able to support 4G data transmission.

The application may be tested prior to release to a general population of users. This "pre-launch" testing phase may involve analyzing the performance of an application under test (AUT) under different network conditions. The different network conditions have traditionally been obtained by either simulation or by physically transporting a test device (TD) that is executing the AUT to a particular geolocation. Simulation lacks fidelity to real-world conditions, is expensive to build and maintain, and may result in developers correcting problems that appear in simulation but not in the real-world. As a result, simulation of varying network conditions is of limited value. Physically transporting the TD and an operator to perform the tests may provide useful test data, but is expensive and time consuming. At the same time, testing has become even more important given the worldwide deployment and use of applications.

Once the application has been deployed to the general population of users and is in a "post-launch" phase, additional information about the conditions of the network and the use by the application of the network may be also useful the developer. For example, data about geolocation and connectivity to the network during usage of the application may allow the developer to adjust the application to provide a better experience to the user.

Described in this disclosure are techniques and systems to acquire information in one or more of the pre-launch and post-launch phases of the application. Pre-launch testing may be facilitated using a collection of proxy host devices that connect to a first network and one or more proxy access devices that provide access to a second network. The proxy access device may execute a local traffic module to facilitate the transfer of data between the first network and the second network. The transfer may be unidirectional or bidirectional. In some implementations, the local traffic module may execute within a non-privileged user space of an operating system of the proxy access device.

The proxy access devices may be located at various geolocations, may utilize different telecommunication companies, and so forth. The proxy access devices may be homogenous, such as of the same make and model, or may differ from one another. For example, the proxy access devices may comprise relatively inexpensive commodity cellphones that provide data connectivity to the WCDN of a particular telecommunication company. Continuing the example, each proxy access device may include a unique subscriber identity module (SIM) that stores information used to connect to the WCDN.

During pre-launch testing, the AUT may be used with a pre-launch software development kit (SDK) that provides the functionality described next. The AUT executes on the TD and generates AUT traffic. The AUT traffic may include outbound application traffic and inbound application traffic. The AUT traffic may be destined for one or more destination devices. During operation outside of the testing system described herein, the AUT traffic would typically be transferred to the destination device using the first network at the first geolocation where the test device is located.

As described in this disclosure, during testing, the developer may use the functionality in the pre-launch SDK to select a particular proxy access device to use for testing. For example, the developer who is present in Sacramento, Calif., USA, may want to test operation of the AUT on the WCDN in Bangalore, Karnataka, India. Continuing the example, the developer utilizes a user interface provided by the pre-launch SDK to select the proxy access device in Bangalore. Once selected, in one implementation the pre-launch SDK redirects the AUT traffic to the selected proxy access device by way of the first network. In another implementation, router configuration data may be sent to a router through which the AUT traffic will be sent. Responsive to the router configuration data, the router may be configured to subsequently direct the AUT traffic to the selected proxy host device.

The proxy access device, in turn, transfers data between the first network and a second network. For example, the proxy access device located in Bangalore may be a cellphone that is tethered to a proxy host device and also is able to connect to the Vodafone India WCDN. The proxy host device provides various functions. These functions may include configuring the proxy access device, retrieving status data about the proxy access device, connecting the proxy access device to the first network, gathering proxy session data, and so forth.

The outbound application traffic is sent from the TD at a first geolocation to a proxy host device using the first network, which then sends the AUT traffic to the proxy access device. The proxy access device in turn sends the traffic to the second network, such as the WCDN. The inbound application traffic is received from the second network at the proxy access device, and is sent to the proxy host device at a second geolocation. The proxy host device in turn sends the inbound application traffic to the TD. From the standpoint of the AUT, by using the pre-launch SDK functionality without the TD ever having physically moved from the first geolocation, the network being used to access the destination device is the WCDN in India at the second geolocation where the proxy access device is located.

As mentioned above, the proxy host device may gather proxy session data. The proxy session data may include, but is not limited to, packet captures, metrics associated with connectivity to the second network, and so forth. For example, the proxy session data may indicate the time when a Hypertext Transfer Protocol (HTTP) request was sent and the time when a response to the request was received. This information may be used to determine latency associated with the request, as measured at the second geolocation. Because the proxy session data is obtained at the second geolocation, network issues associated with the connection between the TD and the proxy access device are not collected.

Post-launch, the AUT may be deployed with a post-launch SDK that allows for the collection and transmission of deployed log data. The deployed log data provides information about the real-world use of deployed devices that are being utilized by users. This information may include details about what function of the AUT was in use, network conditions, geolocation of the deployed device, and so forth. The end user may be offered the opportunity to opt in or opt out of the collection of the deployed log data. The deployed log data may omit identifying information or may otherwise be anonymized to maintain the confidentiality of the user.

In some implementations, the post-launch SDK provides for the acquisition of the deployed log data while executing within a non-privileged user space of an operating system of the deployed device. For example, the post-launch SDK may be included during compile-time in the production of the AUT. While executing, the post-launch SDK may then gather the deployed log data. The deployed log data may be provided to a server using a push or pull mechanism. For example, the push mechanism executing on the deployed device may send the deployed log data every five minutes the application is executing. In another example, the pull mechanism may involve the server polling the deployed device to request transmission of the deployed log data that may be available.

The proxy session data, the deployed log data, and so forth, may be analyzed to generate information about the AUT, interaction with the destination device, performance of the second network, and so forth. Report data may be generated and provided to the developer or other entities for subsequent use. Based on the report data, the AUT may be modified, the telecommunication company may be provided with diagnostic information for them to improve their performance, and so forth.

By using the techniques described herein, testing of an AUT may be performed in one or both of the pre-launch and post-launch phases quickly, comprehensively, and cost effectively. For example, the developer may select a particular proxy access device to use and run tests of the AUT using the second network without ever leaving their office. Effects on the AUT resulting from network issues may be discovered more readily and corrected, resulting in an improved user experience, improved mobile device battery life, a reduction in otherwise unnecessary traffic on the second network, and so forth.

FIG. 1 depicts a system 100 for testing applications that utilize network resources, according to one implementation. A developer 102 may be an individual, group of individuals, or entity that is tasked with creating a new application, maintaining an existing application, re-factoring an existing application, and so forth. The developer 102 may be working on an application under test (AUT) 104. The AUT 104 may be executed on a computing device such as a test device (TD) 106, a workstation 108, and so forth. For example, the TD 106 may comprise a mobile device such as a smart phone, tablet computer, wearable computing device, and so forth. The workstation 108 may comprise a laptop, desktop computer, and so forth.

The AUT 104 may be an application that is at any stage in a development or maintenance lifecycle. For example, the AUT 104 may comprise an alpha (or prerelease) version of software, or may comprise a previously released production version that is undergoing further testing.

The workstation 108 may include an integrated development environment (IDE) to facilitate the creation and editing of program code, debugging, compiling, and so forth. In some implementations, the workstation 108 may comprise an emulator or simulator that is designed to execute the AUT 104 as if it were executing on another piece of hardware, under a different operating system, and so forth.

The developer 102 may test the AUT 104 to determine problems associated with use of the AUT 104. Once those problems have been determined, they may be mitigated. For example, the developer 102 may change the program code of the AUT 104 to remedy the problem. The developer 102 may use the techniques described below to determine at least some of the problems associated with operation of the AUT 104.

One or more of the developer 102, the TD 106, or the workstation 108 may be located at a first geolocation 110(1). The geolocation 110 comprises a geographic location, such as a particular room, building, city, state, country, and so forth. For example, the geolocation 110 may be specified by a set of coordinates with regard to latitude and longitude on the surface of the Earth.

One or more of the TD 106 or the workstation 108 may be connected to a first network 112(1). The first network 112(1) may, in turn, be connected to or be part of a larger network. For example, the first network 112(1) may comprise the Internet. The connection used by the TD 106 or the workstation 108 may include, but is not limited to, a wired Ethernet connection, a wireless local area network (WLAN) connection such as Wi-Fi®, and so forth. For example, the first geolocation 110(1) may comprise an office where the developer 102 is working. The TD 106 may connect to a local Wi-Fi® access point that is connected via Ethernet cable to a router. The router, in turn, is connected to a cable modem that provides connectivity to the Internet.

During operation, the AUT 104 may rely on access to an external resource, such as a destination device 116. For example, the AUT 104 may comprise a social networking application that sends data generated by a user and retrieves for presentation information from a server. As a result, in some implementations, the AUT 104 may require access to the destination device 116 for normal operation.

A single destination device 116 is depicted for ease of illustration and not necessarily as a limitation. For example, the AUT 104 may exchange AUT traffic 114 with many different destination devices 116 during operation.

The AUT 104 may generate AUT traffic 114 that is exchanged with the destination device 116 during operation. Traditionally, the AUT traffic 114 generated by the TD 106 at the first geolocation 110(1) would be sent to the first network 112(1) and onto the destination device 116. However, this traditional situation limits the ability to generate test data to the first geolocation 110(1).

To provide the functionality described herein, the developer 102 may incorporate a software development kit (SDK) into the AUT 104. For example, at compile time, the SDK may be included into the compiled AUT 104. In other implementations, techniques other than an SDK may be used to provide the functionality described herein. For example, lines of computer code that provide the functionality of at least a portion of the SDK may be incorporated into the code base of the AUT 104.

The SDK is configured to provide a user interface to the developer 102 that allows for the redirection of the AUT traffic 114. The SDK may comprise instructions to establish communication with the management server 118. For example, the SDK may add a user interface that allows the developer 102 to interact with the management module 120.

The management server 118 utilizes the management module 120 to coordinate the activities of one or more of proxy host devices 122 or proxy access devices 124. The proxy host device 122 connects to the first network 112(1) and also to one or more of the proxy access devices 124. For example, the proxy host device 122 may comprise a desktop computer to which four proxy access devices 124 are tethered. In some implementations, the proxy host device 122 may comprise a tablet computer, server, etc. Any number of proxy access devices 124 may be tethered to the proxy host device 122.

The proxy access devices 124, in turn, are able to connect to a network access point 126. The network access point 126 provides connectivity to a second network 112(2). For example, the proxy access devices 124 may comprise commodity cellphones, the network access points 126 may comprise cell phone towers, and the second network 112(2) may comprise a WWAN, such as a wireless cellular data network (WCDN). The second network 112(2) may in turn be connected to the first network 112(1). For example, the WCDN operated by a telecommunication company may interconnect or have a peering agreement with an Internet backbone provider. As a result, a user of the second network 112(2) may be able to access resources on the first network 112(1), and vice versa.

The proxy access devices 124 may be located at a geolocation 110 that is different from that of the TD 106. For example, the proxy host device 122 and attached proxy access devices 124 may be installed at a second geolocation 110(2), such as in another city, state, country, and so forth.

Returning to the AUT 104, as part of the testing process, the developer 102 may use the user interface to access the management module 120 of the management server 118. From the user interface, the developer 102 may select one or more of a particular geolocation 110 or particular proxy access device 124 to use during testing. The management module 120 may maintain information about the proxy access devices 124, such as geolocation 110, availability, cost, type of proxy access device 124, and so forth.

The management module 120 may coordinate establishment of the first connection between the AUT 104 and the proxy access device 124 that was selected. For example, based on the selection by the developer 102, the management module 120 may determine the proxy host device 122 and retrieve information such as digital certificates, cryptographic credentials, network address, and so forth. In one implementation, the management module 120 may communicate with proxy host device 122 to prepare the proxy host device 122 for communication with the AUT 104. In another implementation, the management module 120 may provide configuration data to the AUT 104, which in turn connects to the proxy host device 122 and sends the configuration data.

During testing, the AUT traffic 114 may be routed through the first network 112(1) to the proxy host device 122, through the proxy access device 124 to the second network 112(2), and then onto the first network 112(1) to ultimately arrive at the destination device 116. The AUT traffic 114 may include outbound application traffic 128 and inbound application traffic 130. The output application traffic 128 may comprise data that is sent from the AUT 104 to the destination device 116. The inbound application traffic 130 may comprise data that is sent from the destination device 116 to the AUT 104. During operation, the AUT 104 directs the outbound application traffic 128 to the proxy host device 122 associated with the selected proxy access device 124. The proxy host device 122 in turn transfers the outbound application traffic 128 to the proxy access device 124, which then sends the outbound application traffic 128 to the second network 112(2). The second network 112(2) may then send the outbound application traffic 128 to the destination device 116. Inbound application traffic 130 from the destination device 116 may follow the reverse path.

The management server 118 may collect log data 132 associated with operation of the system. The log data 132 may include proxy session data 134. The proxy host device 122 may be configured to generate the proxy session data 134. The proxy session data 134 may include "breadcrumb" data, information associated with operation of the proxy access device 124, packet capture of data transferred by the proxy host device 122, and so forth. The breadcrumb data may include, for a particular instant or interval of time, one or more of: a current page on a website, type of network that the proxy access device 124 is connected to, quantity of data received, quantity of data transmitted, latency to the destination device 116, data throughput, received signal strength, transmit power, cost associated with data transfer on the second network 112(2), and so forth. For example, the breadcrumb data may indicate that the proxy access device 124 was connected at timestamp 201508172312030092 to webpage http://www.example.com/main.html using a 3G network connection with a received signal strength of 14 dBm, a transmit power of 7 dBm, data throughput of 400 Kbps, and so forth. The proxy session data 134 is thus the product of the AUT 104 operating on a real-world second network 112(2) at a desired geolocation 110. The resulting proxy session data 134 is representative of the real world, including the complexities and nuances associated therewith.

The management server 118 may obtain the proxy session data 134. For example, the proxy host device 122 may stream the proxy session data 134 to the management server 118 during the test session. In another example, the management server 118 may poll the proxy host devices 122.

Instead of, or in addition to, the proxy session data 134, one or more deployed devices 136 may provide deployed log data 138 to the management server 118. The deployed devices 136 may include, but are not limited to, smartphones, laptops, tablet computers, embedded devices, wearable computing devices, appliances, automobiles, aircraft, and so forth. The deployed device 136 may execute the AUT 104 that incorporates the SDK. The SDK on the deployed device 136 may be configured to collect deployed log data 138 during operation of the AUT 104 on the deployed device 136. The deployed log data 138 may comprise information indicative of, at a particular time, one or more of: the geolocation 110 of the deployed device 136, breadcrumb data, and other information associated with the AUT traffic 114 or the operation of the deployed device 136. For example, the user may agree to allow for the collection of the deployed log data 138 on the deployed device 136. While the user is using the AUT 104, deployed log data 138 is collected. As a result, the deployed log data 138 comprises real-world information that is obtained from actual users using the AUT 104. The geolocation data may be obtained from a positioning device such as a GPS receiver, from a service such as Wi-Fi® hotspot geolocation lookup, from a network provider based on signal strength or time delay at several network access points 126, and so forth.

An analysis module 140 may be configured to process the proxy session data 134 and generate report data 142. For example, the analysis module 140 may parse the proxy session data 134 to determine a first timestamp of when a first request was sent and a second timestamp of when a first response to the first request was received. Based on the first timestamp and second timestamp, a latency to fulfill the request to the second network 112(2) may be determined.

In some implementations, the report data 142 may specify one or more optimizations of possible modifications to the AUT 104. For example, the report data 142 may specify a particular portion of the AUT 104 that is generating requests with latencies over a threshold value.

The deployed log data 138 may be transmitted in real time or at specified intervals to the management server 118 or another device. For example, the AUT 104 on the deployed device 136 may be configured to send the deployed data 138 in real time. Real time or near real time may comprise actions that take place within a threshold maximum amount of time. For example, the deployed log data 138 may be deemed to be real time if collected and transmitted within 100 milliseconds (ms). In a real time or near real time configuration, the management server 118 may be able to quickly generate report data 142 indicative of a problem associated with the AUT 104. As a result, the developer 102 may be able to quickly mitigate problems, thus improving the user experience.

During testing, the developer 102 may contemporaneously acquire the proxy session data 134 and the deployed log data 138. For example, the developer 102 may use the TD 106 to execute the AUT 104 and test a different geolocation 110 while a number of users are using the deployed devices 136.

Figure 2:
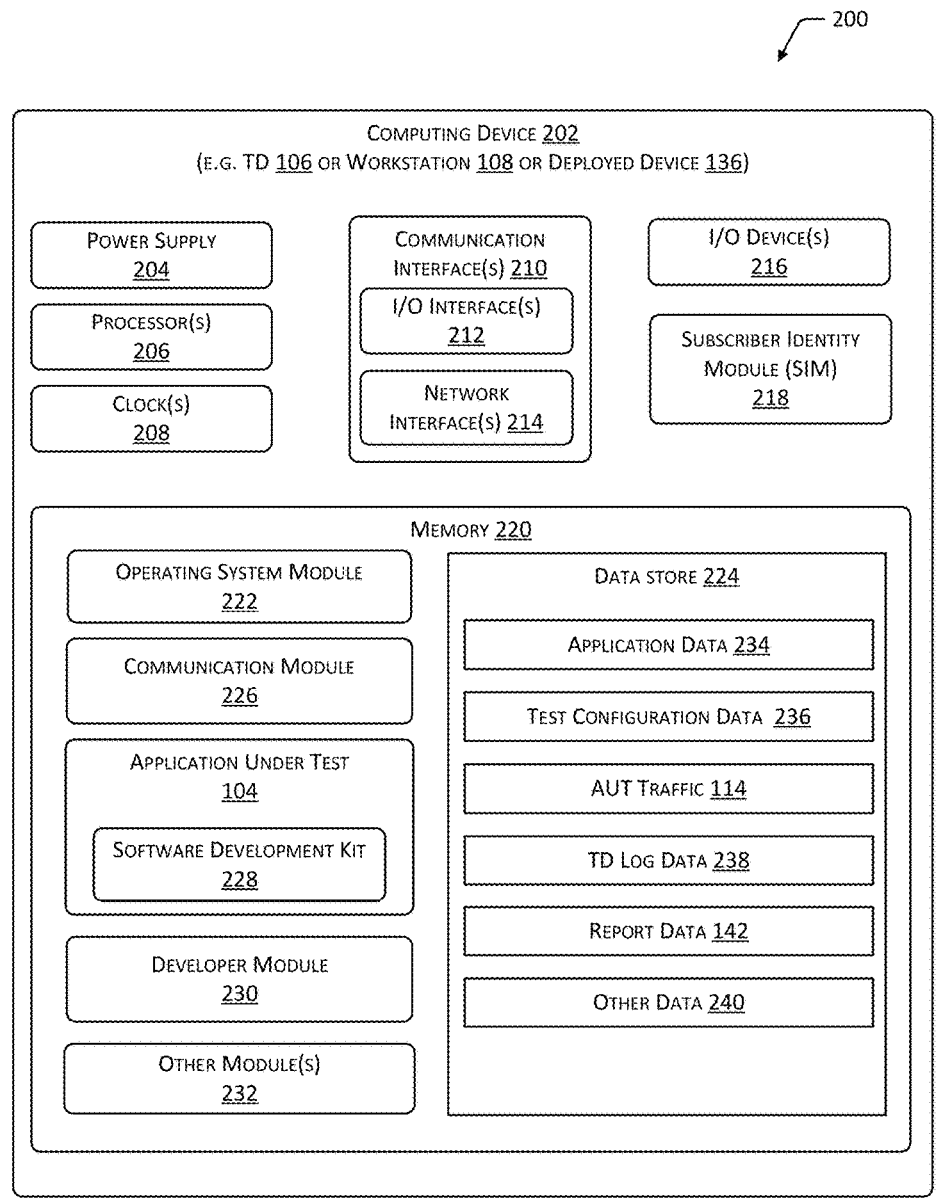
FIG. 2 is a block diagram of a computing device such as a test device, workstation, or deployed device within the scope of the present disclosure, according to one implementation.

FIG. 2 is a block diagram 200 illustrating a computing device 202 within the scope of the present disclosure. The computing device 202 may include one or more TDs 106, workstations 108, deployed devices 136, or other devices. Any type of computing device 202 and any number of networked computing devices may perform the implementations described herein.

One or more power supplies 204 may be configured to provide electrical power suitable for operating the components of the computing device 202. In some implementations, the power supply 204 may include a rechargeable battery, fuel cell, photovoltaic cell, power conditioning circuitry, and so forth.

The computing device 202 may include one or more hardware processor(s) 206 (processors) configured to execute one or more stored instructions. The processor(s) 206 may include one or more cores. One or more clocks 208 may provide information indicative of date, time, ticks, and so forth. For example, the processor(s) 206 may use data from the clock 208 to generate a timestamp, trigger a preprogrammed action, and so forth.

The computing device 202 may include one or more communication interfaces 210, such as input/output (I/O) interfaces 212, network interfaces 214, and so forth. The communication interfaces 210 may enable the computing device 202, or components of the computing device 202, to communicate with other devices or components of the computing device 202. The I/O interfaces 212 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 212 may couple to one or more I/O devices 216. The I/O devices 216 may include any manner of input device or output device associated with the computing device 202. For example, I/O devices 216 may include touch sensors, keyboards, mouse devices, microphones, image sensors (e.g., cameras), scanners, displays, speakers, haptic devices, printers, positioning devices, and so forth. The positioning device may comprise one or more of a satellite radionavigation system, inertial navigation system, terrestrial radionavigation system, or other device configured to generate data indicative of the geolocation 110. For example, the satellite radionavigation system may comprise a Global Positioning System (GPS) receiver, the terrestrial radionavigation system may utilize information from the network access points 126, and so forth. In some implementations, the I/O devices 216 may be physically incorporated with the computing device 202 or may be externally placed.

The network interfaces 214 may be configured to provide communications between the computing device 202 and other devices, such as the I/O devices 216, routers, access points, and so forth. The network interfaces 214 may include devices configured to couple to one or more networks 112 including local area networks (LANs), WLANs, wide area networks (WANs), WWANs, and so forth. For example, the network interfaces 214 may include devices compatible with Ethernet, Wi-Fi®, Bluetooth®, ZigBee®, Z-Wave, 3G, 4G, LTE, and so forth.

The computing device 202 may include one or more busses or other internal communications hardware or software that allows for the transfer of data between the various modules and components of the computing device 202.

The computing device 202 may include a subscriber identity module (SIM) 218. For example, the TD 106 and the deployed device 136 may include SIMs 218. The SIM 218 may comprise a non-transitory computer-readable storage media that may store information such as an international mobile subscriber identity (IMSI) number, cryptographic keys, integrated circuit card identifier (ICCID), contact information, or other data. The SIM 218 may be used by the network interface 214 for communication with one or more of the networks 112. For example, the IMSI and cryptographic keys stored in the SIM 218 may be retrieved and used to establish communication with a WCDN.

As shown in FIG. 2, the computing device 202 may include one or more memories 220. The memory 220 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 may provide storage of computer-readable instructions, data structures, program modules, and other data for the operation of the computing device 202. A few example modules are shown stored in the memory 220, although the same functionality may alternatively be implemented in hardware, firmware, or as a system on a chip (SoC).

The memory 220 may include one or more operating system (OS) modules 222. The OS module 222 may be configured to manage hardware resource devices such as the I/O interfaces 212, the network interfaces 214, the I/O devices 216, and to provide various services to applications or modules executing on the processors 206. The OS module 222 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; the Mac OS® or iOS™ promulgated by Apple Inc. of Cupertino, Calif., USA; or other operating systems.

A data store 224 and one or more of the following modules may also be stored in the memory 220. The modules may be executed as foreground applications, background tasks, daemons, and so forth. The data store 224 may use a flat file, database, linked list, tree, executable code, script, or other data structure to store information. In some implementations, the data store 224 or a portion of the data store 224 may be distributed across one or more other devices including other computing devices 202, network attached storage devices, and so forth.

A communication module 226 may be configured to establish communications with one or more other devices using one or more of the communication interfaces 210. Communications may be authenticated, encrypted, and so forth. For example, the communication module 226 may utilize digital certificates to authenticate the identity of devices involved in the communication. For example, the communication module 226 may be configured to establish a virtual private network (VPN) connection or tunnel with the proxy host device 122.

The memory 220 may store the AUT 104. As described above, in some implementations, the AUT 104 may incorporate at least a portion of a software development kit (SDK)

228. Elements of the SDK 228 may be configured to execute on the one or more hardware processors. These elements may execute within a user space, as compared to a kernel space, of an operating system executing on the computing device 202. For example, the AUT 104 and the elements of the SDK 228 may execute with privileges of a user account, with the first user account having privileges within the OS that are lesser than a root account, superuser, administrator, or other types of elevated accounts.

The SDK 228 may be configured to direct the AUT traffic 114 to and from a particular network address. For example, the SDK 228 may be configurable to intercept the outbound application traffic 128 and direct that traffic to the selected proxy host device 122. In one implementation the SDK 228 may implement or call on VPN functionality, such as provided by the communication module 226. For example, the SDK 228 may issue a request to the communication module 226 to establish an encrypted tunnel to the proxy host device 122. Once established, the AUT traffic 114 may be direct through the VPN to the proxy host device 122.

A developer module 230 may be stored in the memory 220. The developer module 230 may comprise one or more of an integrated development environment, build systems, and so forth. For example, the developer module 230 may include Xcode® from Apple Inc., Android Studio from Google Inc., Gradle™ as promulgated at www.gradle.org, Jenkins as promulgated at www.jenkins-ci.org, Travis CI as promulgated at www.travis-ci.org, Perforce™ from Perforce Software, Inc., and so forth.

Other modules 232 may also be present in the memory 220. In some implementations, one or more of the modules may be stored at least in part in the memory 220 of other devices, may be executed at least in part on the other devices, and so forth. For example, one or more functions associated with the developer module 230 may execute on a server.

Various information used by the computing device 202 may be stored in the data store 224. For example, application data 234 may be stored in the data store 224 and may comprise information associated with operation of the module such as the AUT 104, the developer module 230, and so forth.

Test configuration data 236 may also be stored in the data store 224. The test configuration data 236 may comprise information associated with the testing. For example, the test configuration data 236 may specify the second geolocation 110(2) selected by the developer 102 that will be used for network testing, network address of the proxy host device 122, credentials to access the proxy host device 122, costs associated with access to the proxy access device 124, information from the management server 118 about the proxy host device 122, proxy access device 124, and so forth. In some implementations, at least a portion of AUT traffic 114 may be stored in the data store 224.

In some implementations, such as where the computing device 202 comprises the TD 106 or the workstation 108, TD log data 238 may be stored. For example, the TD log data 238 may comprise information associated with debugging performed by the developer module 230 on the workstation 108.

Report data 142 may also be stored in the data store 224. For example, the management server 118 may return report data 142 to the TD 106 or the workstation 108 for presentation to the developer 102.

Other data 240 may also be stored in the data store 224. For example, the other data 240 may include one or more threshold values. For example, the threshold values may include latency times that, when exceeded, result in an alert in the report data 142. Threshold values may also include maximum values, minimum values, ranges of values, and so forth.

In different implementations, different computing devices 202 may have different capabilities or capacities. For example, workstation 108 may have significantly more processor 206 capability and memory 220 capacity compared to the processor 206 capability and memory 220 capacity of the TD 106 or deployed device 136.

Figure 3:
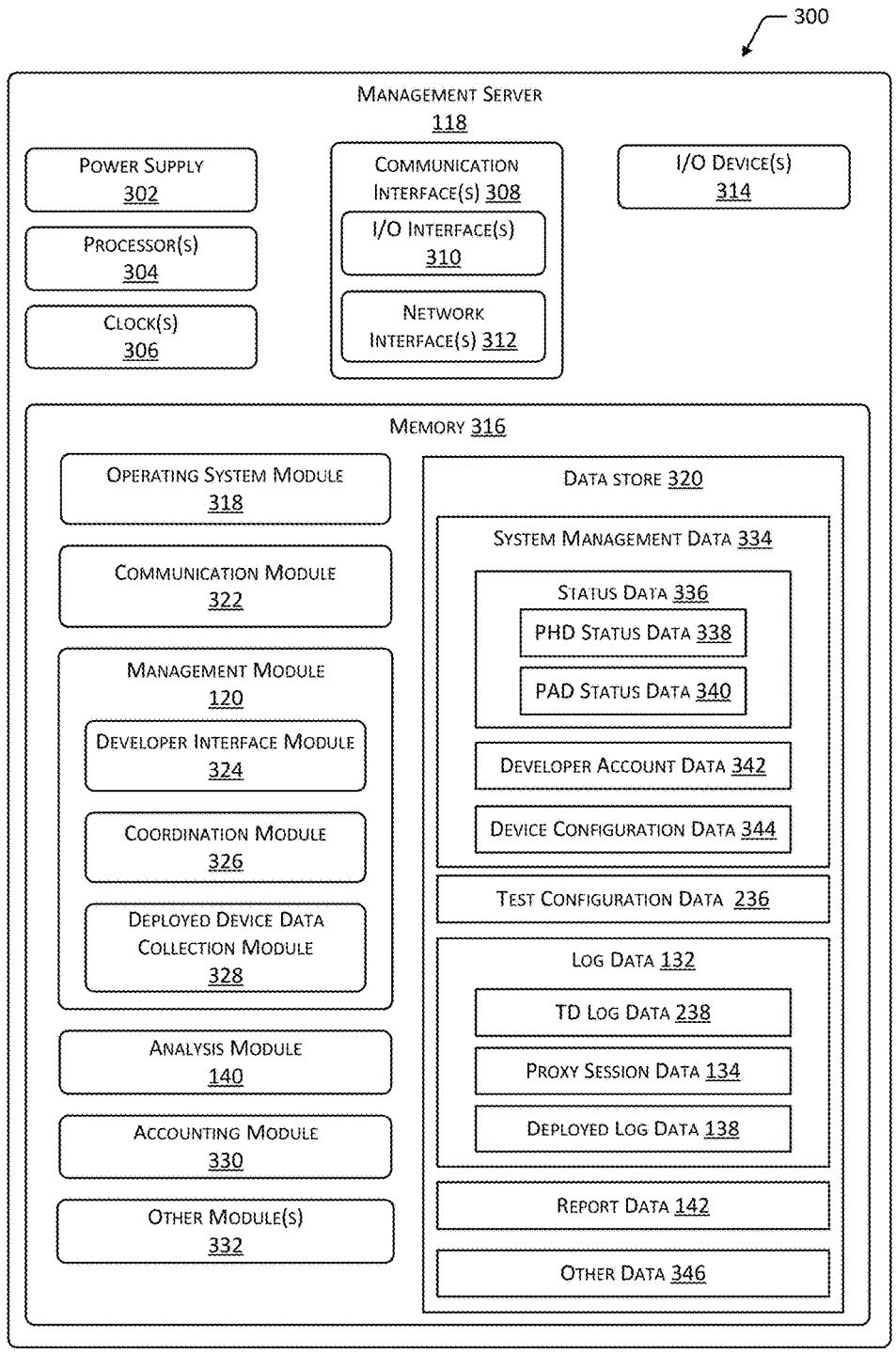
FIG. 3 is a block diagram of a computing device acting as a management server within the scope of the present disclosure, according to one implementation.

FIG. 3 is a block diagram 300 of a computing device acting as a management server 118 within the scope of the present disclosure, according to one implementation. The management server 118 may provide functionality such as coordinating communication between an AUT 104 and the proxy access devices 124 that are connected to proxy host devices 122.

Similar to the computing device 202 described above with regard to FIG. 2, the management server 118 may include one or more of: power supplies 302, hardware processor(s) 304 (processors), clocks 306, or communication interfaces 308. The communication interface 308 may include I/O interfaces 310, network interfaces 312, and so forth.

The I/O interface(s) 310 may couple to one or more I/O devices 314. The I/O devices 314 may include any manner of input device or output device, such as described above with regard to FIG. 2. In some implementations, the I/O devices 314 may be physically incorporated with the management server 118 or may be externally placed.

The network interfaces 312 may be configured to provide communications between the management server 118 and other devices. As described above with regard to FIG. 2, the network interfaces 312 may include devices configured to couple to one or more networks 112.

The management server 118 may include one or more busses or other internal communications hardware or software that allows for the transfer of data between the various modules and components of the management server 118.

As shown in FIG. 3, the management server 118 may include one or more memories 316, such as described above with regard to FIG. 2. The memory 316 may include one or more non-transitory CRSM. The memory 316 may provide storage of computer-readable instructions, data structures, program modules, and other data for the operation of the management server 118. A few example modules are shown stored in the memory 316, although the same functionality may alternatively be implemented in hardware, firmware, or as a SoC.

The memory 316 may include one or more OS modules 318, such as described above with regard to FIG. 2.

A data store 320 and one or more of the following modules may also be stored in the memory 316. The modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including other computing devices, network attached storage devices, and so forth.

A communication module 322 may be configured to establish communications with one or more other devices using one or more of the communication interfaces 308. Communications may be authenticated, encrypted, and so forth. For example, the communication module 322 may utilize digital certificates to authenticate the identity of devices involved in the communication.

The memory 316 may store the management module 120. The management module 120 may include one or more of a developer interface module 324, coordination module 326, deployed device data collection module 328, and so forth. The analysis module 140, an accounting module 330, or other modules 332 may also be present in the memory 316.

Developer interface module 324 provides interface functionality to the developer 102 or application used by the developer 102. For example, the developer interface module 324 may present a user interface for the developer 102 to select a particular proxy access device 124, or may comprise an application programming interface (API) that the SDK 228 may use to access one or more of the functions of the management server 118. In some implementations, at least a portion of the developer interface module 324 may be provided as part of the SDK 228.

The coordination module 326 is configured to coordinate various functions of the system 100. The coordination module 326 may be configured to access system management data 334 stored in the data store 320 to direct operation of the system. The system management data 334 may include status data 336, such as proxy host device (PHD) status data 338, the proxy access device (PAD) status data 340, and so forth. The PHD status data 338 may comprise information such as a network address, operational status, information indicative of installed software, version of installed software, current utilization, and so forth. The PAD status data 340 may comprise information such as make and model of the proxy access device 124, OS version of the proxy access device 124, connection status to the second network 112(2), whether the proxy access device 124 is currently in use by another AUT 104, and so forth.

The system management data 334 may also include developer account data 342. The developer account data 342 may include information such as individual account logins and passwords, billing information, usage information, and so forth.

The system management data 334 may also include device configuration data 344. The device configuration data 344 may comprise instructions, applications, modules, and so forth, that may be used to configure one or more of the proxy host device 122 or the proxy access device 124. For example, the device configuration data 344 may include one or more scripts that may be executed by the proxy host device 122 to send instructions to proxy access device 124. These instructions may configure the proxy access device 124 to transfer data between the proxy host device 122 and the second network 112(2).

The data store 320 may also store test configuration data 236, such as described above. In some implementations, the management server 118 may generate at least a portion of the test configuration data 236. The generation of the test configuration data 236 may be based at least in part on information provided by the developer 102. For example, the developer 102 may use the developer interface module 324 to specify parameters such as different types of tests parameters, alarm limits, test thresholds, and so forth. Based on these parameters, the management module 120 may generate the test configuration data 236. In some implementations, test configuration data 236 may be modified by the developer 102, or may be generated entirely by the developer 102 or another device or entity.

Returning to the coordination module 326, the system management data 334 and test configuration data 236 may be used to provide testing functionality to the developer 102. For example, the developer 102 may use the developer interface module 324 to request testing services for the AUT 104. The coordination module 326 may assess the status data 336 to determine information such as geolocations 110, types of networks 112, and so forth, that are available for use. Based on this determination, the coordination module 326 may present information to the developer 102 by way of the developer interface module 324. For example, the information may indicate those geolocations 110 and proxy access devices 124 that are available for testing, cost associated with using those resources, and so forth.

Responsive to a selection by the developer 102, or predefined defaults, the coordination module 326 may coordinate establishment of a connection between the TD 106 and the proxy access device 124 such that AUT traffic 114 from the AUT 104 is directed through the proxy access device 124 and the second network 112(2) to reach the destination device 116. For example, responsive to the selection within a user interface by the developer 102, the AUT 104 may receive a network address and credentials associated with the proxy host device 122 at the selected second geolocation 110(2). The AUT 104 may use the network address and credentials to establish a connection with the proxy host device 122. The AUT traffic 114 may thus be exchanged directly between the AUT 104 that is executing on the TD 106 or the workstation 108 and the proxy host device 122. In another implementation, the management server 118 may act as an intermediary relaying the AUT traffic 114 between the AUT 104 and the proxy host device 122.

The coordination module 326 may be configured to acquire the log data 132. For example, the coordination module 326 may establish a connection with the proxy host device 122 to receive an ongoing stream of proxy session data 134. The stream of proxy session data 134 may be received in real time or near real time while the developer 102 is testing the AUT 104. For example, proxy session data 134 may be sent every five seconds to the management server 118.

In some implementations, the log data 132 may include the TD log data 238. For example, the SDK 228 may send the TD log data 238 to the management server 118.

The deployed device data collection module 328 may be configured to communicate with the deployed devices 136 and obtain the deployed log data 138. The deployed device data collection module 328 may be configured to receive the deployed log data 138 in real time or near real time during use of the AUT 104. For example, the deployed log data 138 may be generated while the AUT 104 executing on the deployed device 136 is exchanging AUT traffic 114 with the destination device 116 by way of particular network 112 at a particular geolocation 110. The deployed log data 138 may be used by the management server 118 to determine if the AUT 104 is experiencing problems on the particular network 112, at the particular geolocation 110, and so forth.

As described above, the analysis module 140 may be configured to use information stored in the data store 320 to generate report data 142. For example, the analysis module 140 may analyze the log data 132 to determine if there are particular WCDNs or parts of a city where the AUT 104 experiences problems using the resources of the destination device 116.

The accounting module 330 may be configured to determine and assess charges associated with the use of the system 100, provide remuneration to operators of the proxy access devices 124, and so forth. For example, the accounting module 330 may provide the developer 102 with a cost to use the particular proxy access device 124 at a particular geolocation 110 for certain amount of time, quantity of data transferred, and so forth. In some implementations, a user may join their mobile device to the system and allow that mobile device to act as a proxy access device 124. For example, during a time of day when the user is not otherwise using their cell phone, they may tether their cell phone to a proxy host device 122 and allow the use of that cell phone as a proxy access device 124. During such use, data associated with the user that is stored on the cell phone may be secured, other applications executing on the cell phone may be terminated, and so forth. These and other measures may be taken to safeguard the security of the data of the user, to prevent an application executing on the cell phone from affecting the results of the test, and so forth. In return for allowing this use, the user may receive remuneration. For example, where the user is a developer 102, the developer 102 may receive a credit on their account. That credit may be used to run tests using a proxy access device 124 associated with another developer 102. In other implementations, the remuneration may comprise a financial transfer such as payment in the form of currency.

In some implementations, one or more of the modules may be stored at least in part in the memory of other devices, may be executed at least in part on the other devices, and so forth. For example, one or more functions associated with the accounting module 330 may execute on another server.

Other data 346 within the data store 320 may include information such as configurations and settings associated with the management server 118 or modules thereof.

Figure 4:
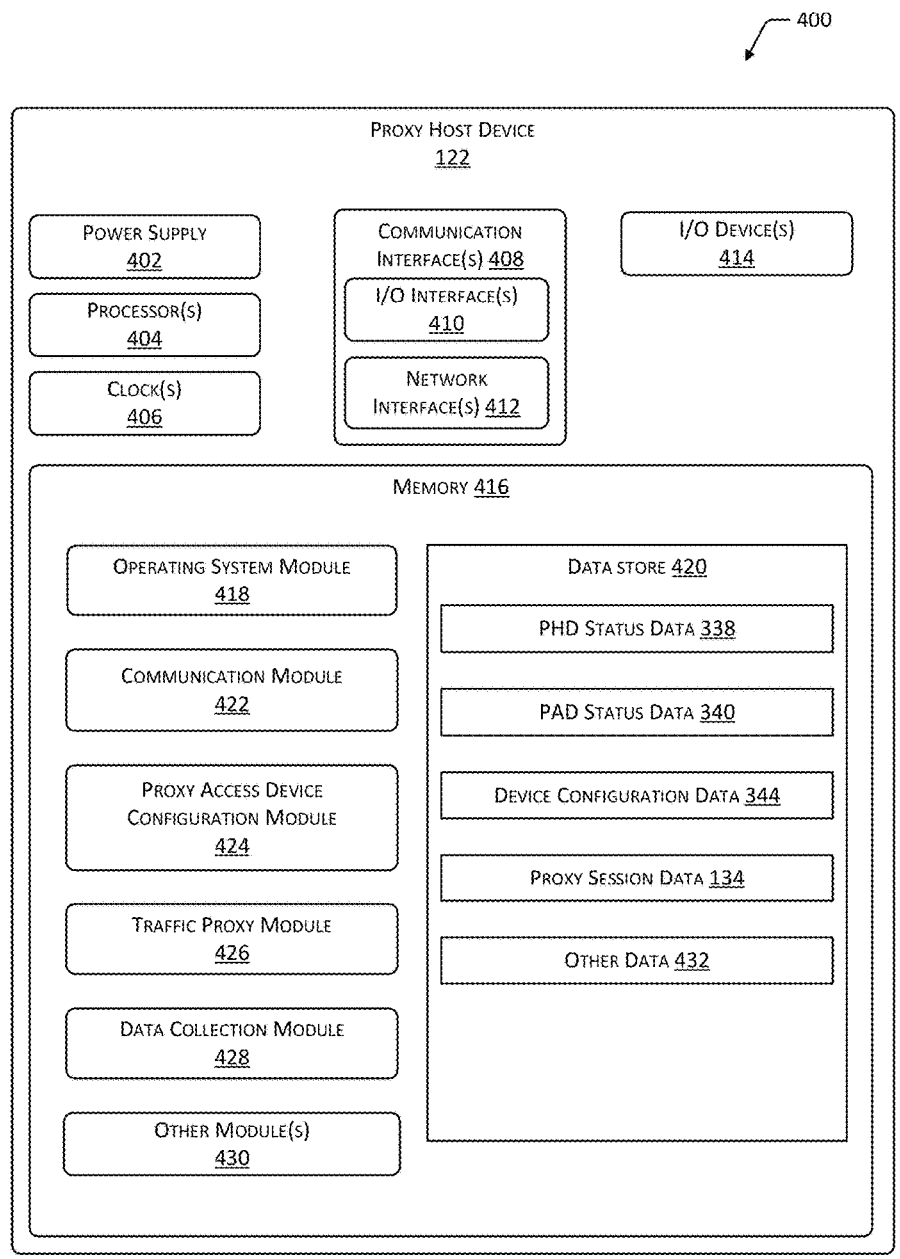
FIG. 4 is a block diagram of a computing device acting as a proxy host device within the scope of the present disclosure, according to one implementation.

FIG. 4 is a block diagram 400 of a computing device 202 acting as a proxy host device 122 within the scope of the present disclosure, according to one implementation. The proxy host device 122 may be implemented using a variety of different types of computing devices 202. For example, a proxy host device 122 may comprise a mini desktop computer, a tablet computer, a server, and so forth.

Similar to that described above with regard to FIG. 2, the proxy host device 122 may include one or more of: power supplies 402, hardware processor(s) 404 (processors), clocks 406, or communication interfaces 408. The communication interface 408 may include I/O interfaces 410, network interfaces 412, and so forth.

The I/O interface(s) 410 may couple to one or more I/O devices 414. The I/O devices 414 may include any manner of input device or output device, such as those described above with regard to FIG. 2. In some implementations, the I/O devices 414 may be physically incorporated with the proxy host device 122 or may be externally placed.

The network interfaces 412 may be configured to provide communications between the proxy host device 122 and other devices. As described above with regard to FIG. 2, the network interfaces 412 may include devices configured to couple to one or more networks 112.

The proxy host device 122 may include one or more busses or other internal communications hardware or software that allows for the transfer of data between the various modules and components of the proxy host device 122.

As shown in FIG. 4, the proxy host device 122 may include one or more memories 416, such as described above with regard to FIG. 2. The memory 416 may include one or more non-transitory CRSM. The memory 416 may provide storage of computer-readable instructions, data structures, program modules, and other data for the operation of the proxy host device 122. A few example modules are shown stored in the memory 416, although the same functionality may alternatively be implemented in hardware, firmware, or as a SoC.

The memory 416 may include one or more OS modules 418, such as described above with regard to FIG. 2.

A data store 420 and one or more of the following modules may also be stored in the memory 416. The modules may be executed as foreground applications, background tasks, daemons, and so forth. The data store 420 may use a flat file, database, linked list, tree, executable code, script, or other data structure to store information. In some implementations, the data store 420 or a portion of the data store 420 may be distributed across one or more other devices including other devices, network attached storage devices, and so forth.

A communication module 422 may be configured to establish communications with one or more other devices using one or more of the communication interfaces 408. Communications may be authenticated, encrypted, and so forth. For example, the communication module 422 may utilize digital certificates to authenticate the identity of devices involved in the communication. For example, the communication module 422 may be configured to establish a VPN connection or tunnel with one or more of the TD 106, the workstation 108, or the management server 118.

The memory 416 may store one or more of a proxy access device (PAD) configuration module 424, a traffic proxy module 426, a data collection module 428, or other modules 430.

The PAD configuration module 424 is configured to send one or more instructions or commands to the proxy access devices 124 that are connected to the proxy host device 122. These instructions may be provided as part of the device configuration data 344 received from the management server 118. These instructions may be designed to enable the proxy access device 124 to send and receive traffic on the second network 112(2), provide information such as the PAD status data 340, and so forth. For example, the PAD configuration module 424 may send and execute a local traffic module and a local status module to the proxy access device 124. These modules are discussed below in more detail with regard to FIG. 5. For example, the PAD configuration module 424 may utilize the Ansible software platform as developed by Michael DeHaan and promulgated at www.ansible.com.

The traffic proxy module 426 is configured to pass the AUT traffic 114 between the TD 106 that is executing the AUT 104 and the proxy access device 124. For example, where the proxy host device 122 utilizes the Linux OS, the Linux proxy service may be used. The traffic proxy module 426 may be configured to connect otherwise dissimilar types of interfaces. For example, the proxy host device 122 may use a network interface 412 to connect the first network 112(1) and a USB I/O interface 410 to connect to (or tether) the proxy access device 124. Once connected, the USB connection to the proxy access device 124 may be presented in the OS module 418 as a network interface through which traffic may be routed.

The connection or tethering between the proxy host device 122 and the proxy access device 124 may be wireless in some implementations. For example, the proxy host device 122 and proxy access device 124 may be in communication with one another using a Bluetooth® wireless interface.

The data collection module 428 may be configured to obtain one or more of the PHD status data 338, the PAD status data 340, the proxy session data 134, or other data. For example, the data collection module 428 may obtain packet captures of the AUT traffic 114 that is being transferred between the proxy host device 122 and the proxy access device 124. Packet captures may be included in the proxy session data 134. For example, the TCPDUMP library promulgated by www.tcpdump.org may be used to acquire the packet captures. As described above, the proxy session data 134 may be sent to one or more of the management server 118, to the TD 106, the workstation 108, or other devices.

One or more of the modules may execute in the user space of the OS module 418. For example, one or more of the proxy access device configuration module 424, the traffic proxy module 426, or the data collection module 428 may execute using the account privileges associated with a user space of the OS module 418. In comparison, the OS module 418 may provide for accounts that provide additional privileges or levels of access, such as a root account, superuser, administrator, and so forth.

In some implementations, one or more of the modules may be stored at least in part in the memory 416 of other devices, may be executed at least in part on the other devices, and so forth.

Other data 432 within the data store 420 may include information such as configurations and settings associated with the proxy host device 122 or modules thereof.

Figure 5:
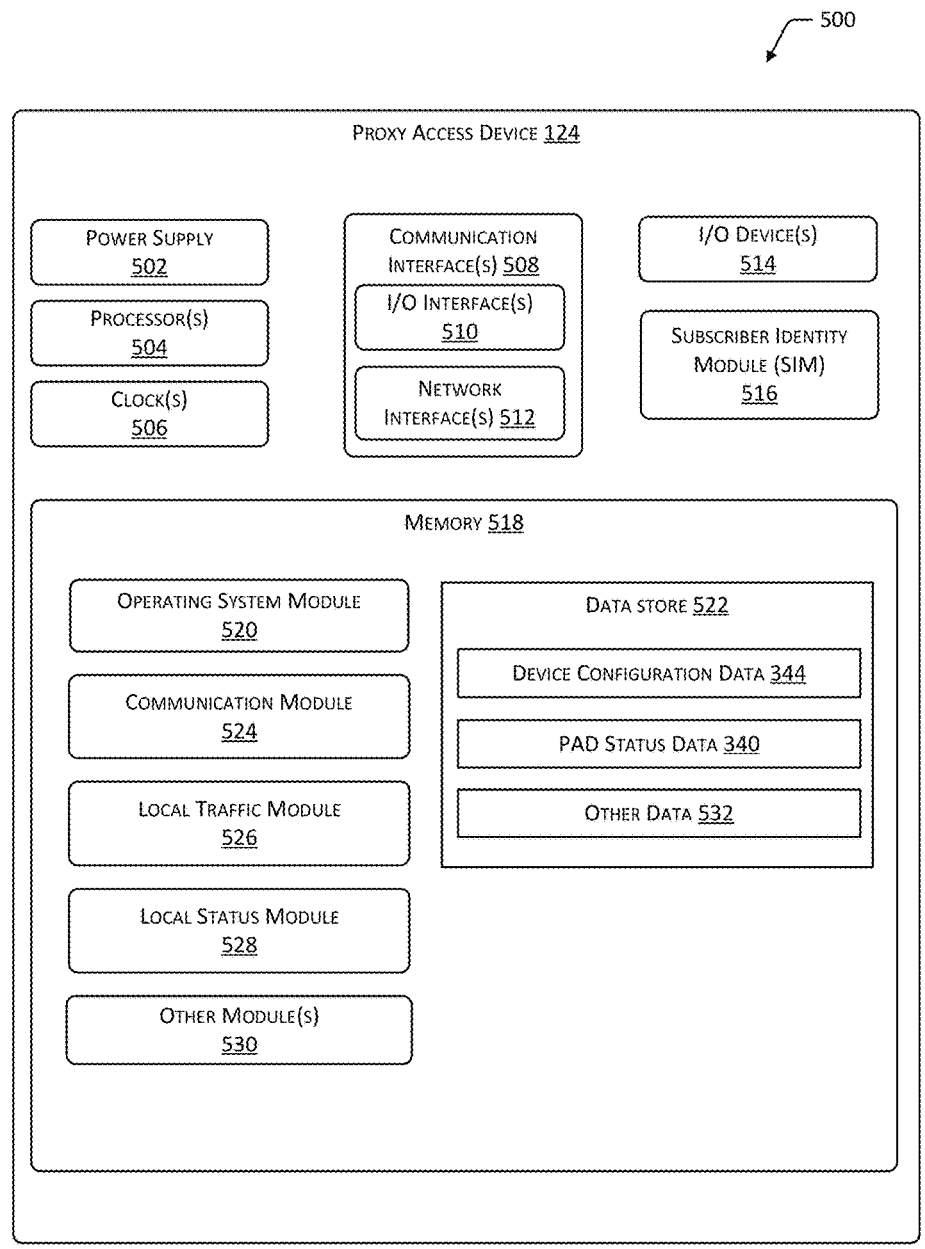
FIG. 5 is a block diagram of a computing device acting as a proxy access device within the scope of the present disclosure, according to one implementation.

FIG. 5 is a block diagram 500 of a computing device acting as a proxy access device 124 within the scope of the present disclosure, according to one implementation. For example, the proxy access device 124 may comprise a cellular phone handset that supports data transmission.

Similar to that described above with regard to FIG. 2, the proxy access device 124 may include one or more of: power supplies 502, hardware processor(s) 504 (processors), clocks 506, or communication interfaces 508. The communication interface 508 may include I/O interfaces 510, network interfaces 512, and so forth.

The I/O interface(s) 510 may couple to one or more I/O devices 514. The I/O devices 514 may include any manner of input device or output device, such as described above with regard to FIG. 2. In some implementations, the I/O devices 514 may be physically incorporated with the proxy access device 124 or may be externally placed.

The network interfaces 512 may be configured to provide communications between the proxy access device 124 and other devices. As described above with regard to FIG. 2, the network interfaces 512 may include devices configured to couple to one or more networks 112.

The proxy access device 124 may include one or more busses or other internal communications hardware or software that allows for the transfer of data between the various modules and components of the proxy access device 124.

The proxy access device 124 may include a SIM 516, such as described above with regard to FIG. 2.

As shown in FIG. 5, the proxy access device 124 may include one or more memories 518, such as described above with regard to FIG. 2. The memory 518 may include one or more non-transitory CRSM. The memory 518 may provide storage of computer-readable instructions, data structures, program modules, and other data for the operation of the proxy access device 124. A few example modules are shown stored in the memory 518, although the same functionality may alternatively be implemented in hardware, firmware, or as a SoC.

The memory 518 may include one or more OS modules 520, such as described above with regard to FIG. 2. For example, the OS module 520 may implement the Apple iOS™ or the Google Android™ operating systems.

A data store 522 and one or more of the following modules may also be stored in the memory 518. The modules may be executed as foreground applications, background tasks, daemons, and so forth. The data store 522 may use a flat file, database, linked list, tree, executable code, script, or other data structure to store information. In some implementations, the data store 522 or a portion of the data store 522 may be distributed across one or more other devices including other computing devices, network attached storage devices, and so forth.

A communication module 524 may be configured to establish communications with one or more other devices using one or more of the communication interfaces 508. Communications may be authenticated, encrypted, and so forth. For example, the communication module 524 may utilize digital certificates to authenticate the identity of devices involved in the communication.

The memory 518 may store one or more of a local traffic module 526, a local status module 528, or other modules 530. The local traffic module 526 is configured to accept traffic from the first communication interface 508(1) and pass that traffic to a second communication interface 508(2). For example, the local traffic module 526 may be configured to direct AUT traffic 114 between a USB I/O interface 510 and a network interface 512 that connects to the second network 112(2).

In some implementations, the local traffic module 526 may be configured to close, terminate, stop, or shut down other modules executing on the processor 504 that are not required for data transfer. For example, the local traffic module 526 may close and user applications and so forth. In some implementations, the local traffic module 526 may block or otherwise restrict the transmission of data to the second network 112(2) that is not associated with the testing of the AUT 104.

The local status module 528 may be configured to acquire the PAD status data 340. For example, the local status module 528 may interrogate the OS module 520, communication interfaces 508, and so forth, to gather information such as processor usage, memory usage, network connection status, received signal strength, transmit power, and so forth. The local status module 528 may provide the PAD status data 340 to the proxy host device 122 via the I/O interface 510.

One or more of the modules may execute in the user space of the OS module 520. For example, one or more of the local traffic module 526 or local status module 528 may execute using the account privileges associated with a user space of the OS module 520. In comparison, the OS module 520 may provide for accounts that provide additional privileges or levels of access, such as a root account, superuser, administrator, and so forth.

As described above, the proxy host device 122 may configure the proxy access device 124. For example, the proxy host device 122 may send the device configuration data 344 to the proxy access device 124 using the USB I/O interface 510. The device configuration data 344 may include the local traffic module 526, the local status module 528, or settings associated therewith. For example, during configuration, the proxy host device 122 may install the local traffic module 526 and local status module 528 on the proxy access device 124.

The other modules 530 in the memory 518 may provide other functions. For example, where the proxy access device 124 is being provided by an end user for participation in the system 100, the other modules 530 may include applications installed by the end user on the proxy access device 124.

In some implementations, one or more of the modules may be stored at least in part in the memory 518 of other devices, may be executed at least in part on the other devices, and so forth.

Other data 532 within the data store 522 may include information such as configurations and settings associated with the proxy access device 124 or modules thereof.

In some implementations, the proxy access device 124 may perform one or more of the functions associated with the proxy host device 122. For example, the proxy access device 124 may implement one or more of the PAD configuration module 424, the traffic proxy module 426, or the data collection module 428.

Illustrative User Interfaces

Figure 6:
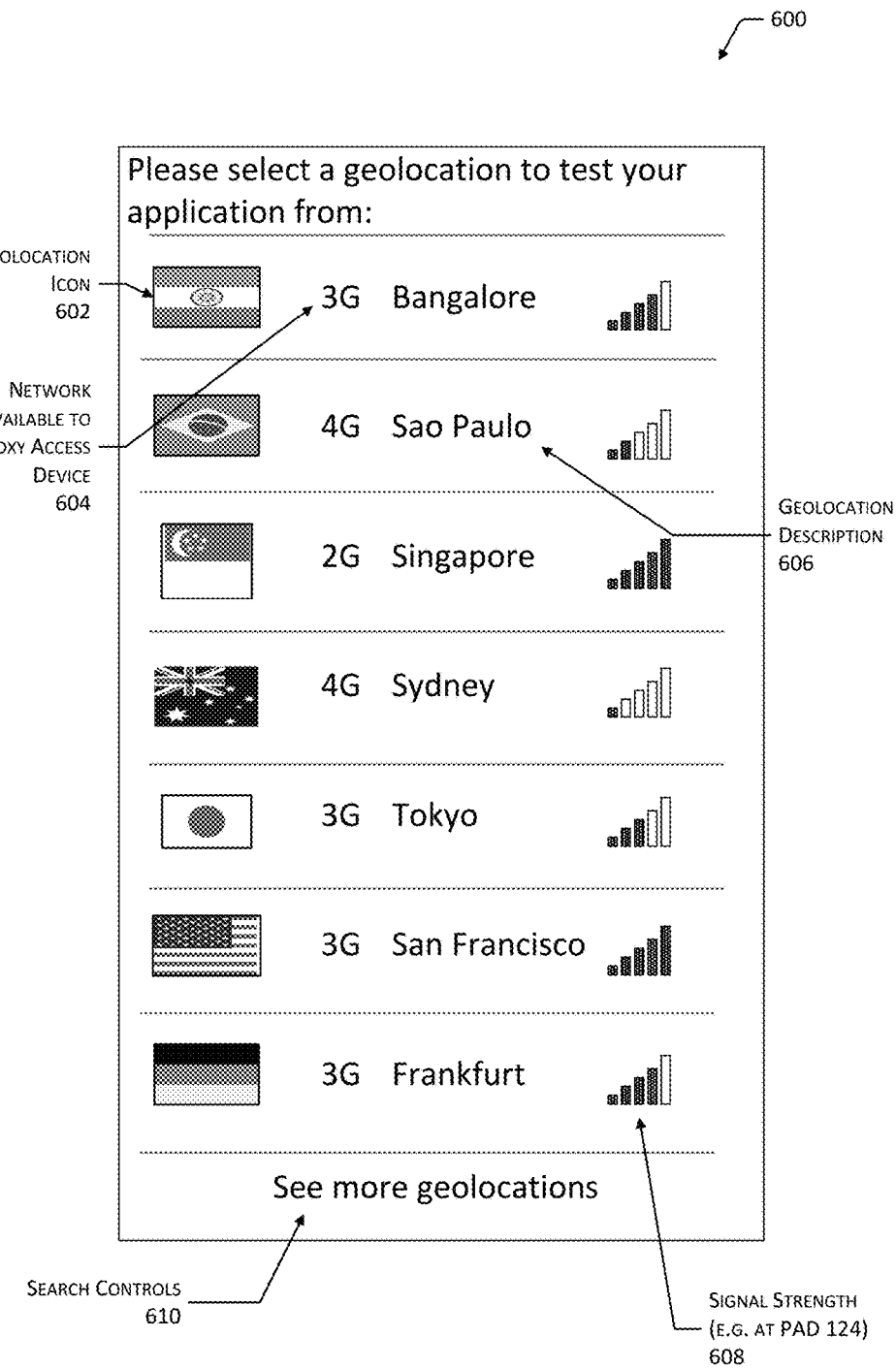
FIG. 6 illustrates a user interface that a developer may use to select a particular geolocation to test the application, according to one implementation.

FIG. 6 illustrates a user interface 600 that a developer 102 may use to select a particular geolocation 110 to test the AUT 104, according to one implementation. In some implementations, the developer interface module 324 may be configured to generate at least a portion of the user interface 600. The user interface 600 may be presented on the TD 106, the workstation 108, or on another device.

The user interface 600 may include one or more geolocation icons 602. For example, the geolocation icon 602 may include a national flag, outline of the state or province, or other iconography that is indicative of a particular geolocation 110.

The user interface 600 may also include information associated with the network available to proxy access devices 604 that is associated with the geolocation 110 indicated by the geolocation icon 602. A geolocation description 606 provides information such as the name of the geolocation 110. Signal strength 608 data may also be presented.

Several different geolocations 110 are available for the developer 102 to use to test the AUT 104. For example, the developer 102 may select the proxy access device 124 that is connected to the 3G network in Bangalore, India, to test operation under those conditions. Continuing the example, developer 102 may select the 4G network in Sydney, Australia, to test operation under those conditions. Once selected, the system 100 may coordinate the connection between AUT 104 and the proxy access device 124 that is located at a second geolocation 110(2) and is connected to a second network 112(2).

As described above, the user interface 600 may be provided as part of the SDK 228 that is incorporated into the AUT 104. In other implementations, the functionality described herein with regards to the SDK 228 may be implemented as separate application, module, and so forth.

Search control 610 may also be presented. The search control 610 may allow the developer 102 to select various combinations of particular geolocations 110, networks 112, types of proxy access devices 124, costs, and so forth. For example, the developer 102 may be particularly interested in testing operation of AUT 104 in Brazil. By using the search control 610, the developer 102 may be presented with the user interface 600 that displays those proxy access devices 124 that are available in Brazil.

Figure 7:
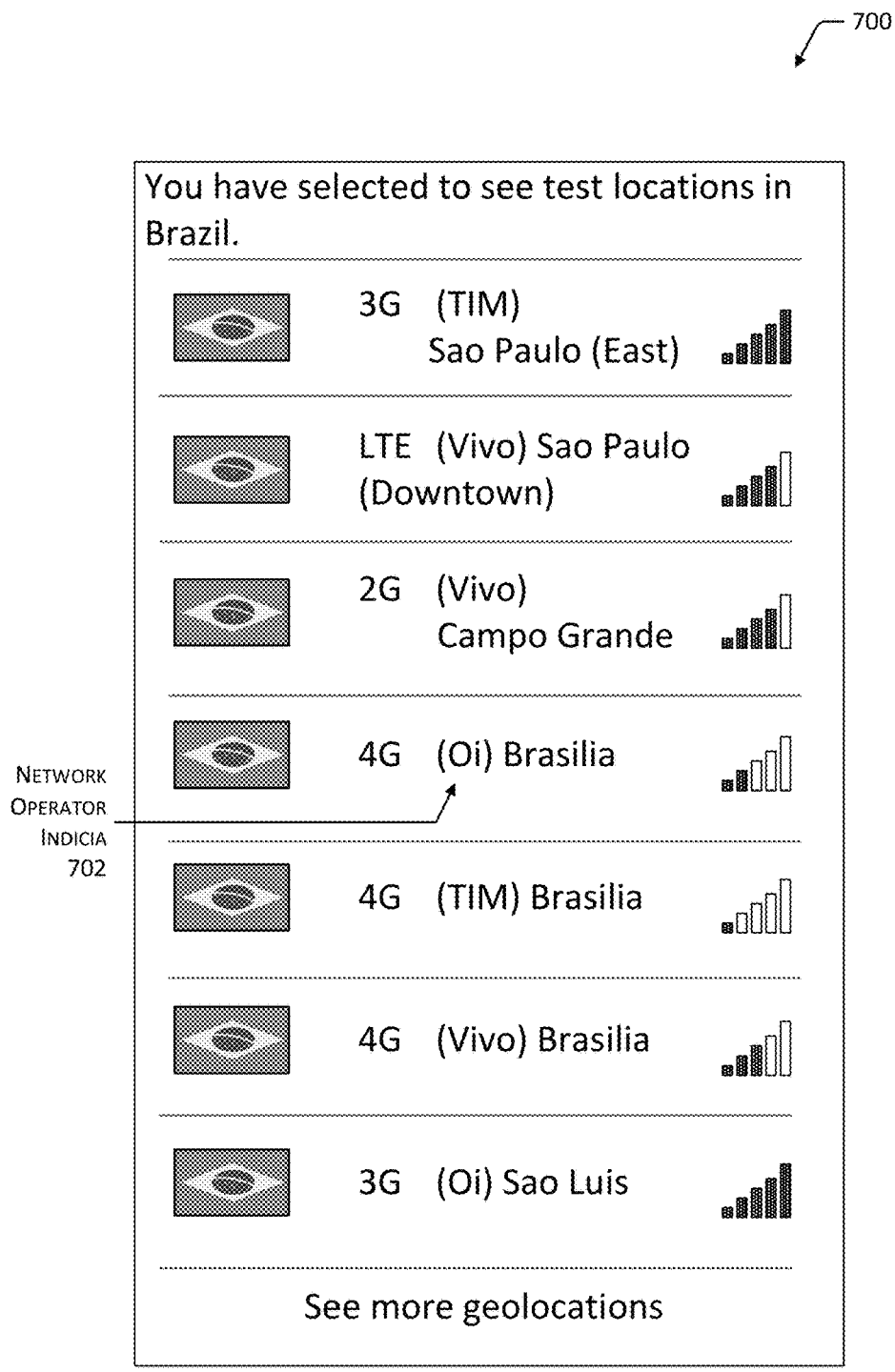
FIG. 7 illustrates another user interface that the developer may use to select a particular geolocation to test the application, according to one implementation.

FIG. 7 illustrates another user interface 700 that the developer 102 may use to select a particular geolocation 110 to test the AUT 104, according to one implementation. In this illustration, the user interface 700 results from a selection by the developer 102 to show those proxy access devices 124 that are available in Brazil. Additional information is also presented within the user interface 700 including the network operator indicia 702. For example, the network operator indicia 702 may comprise text or icons that indicate a particular company, mobile network operator, wireless provider, and so forth.

In some implementations, the information presented in the user interface 600 or 700 to the developer 102 may be summarized or aggregated. For example, individual line items in the user interface may be indicative of a particular proxy host device 122 as opposed to individual proxy access devices 124 connected thereto. Continuing the example, a proxy host device 122 that has four proxy access devices 124 attached thereto, each of which connects to the same mobile network operator, may be presented as a single line item in the user interface.

By providing the ability for the developer 102 to select particular geolocations 110, particular networks 112 to connect to, types of devices, and so forth, the testing allows for targeted troubleshooting. For example, if users of the AUT 104 that access a particular mobile network operator are reporting trouble, the developer 102 may test using proxy access devices 124 that are connected to the particular mobile network operator's network 112.

Figure 8:
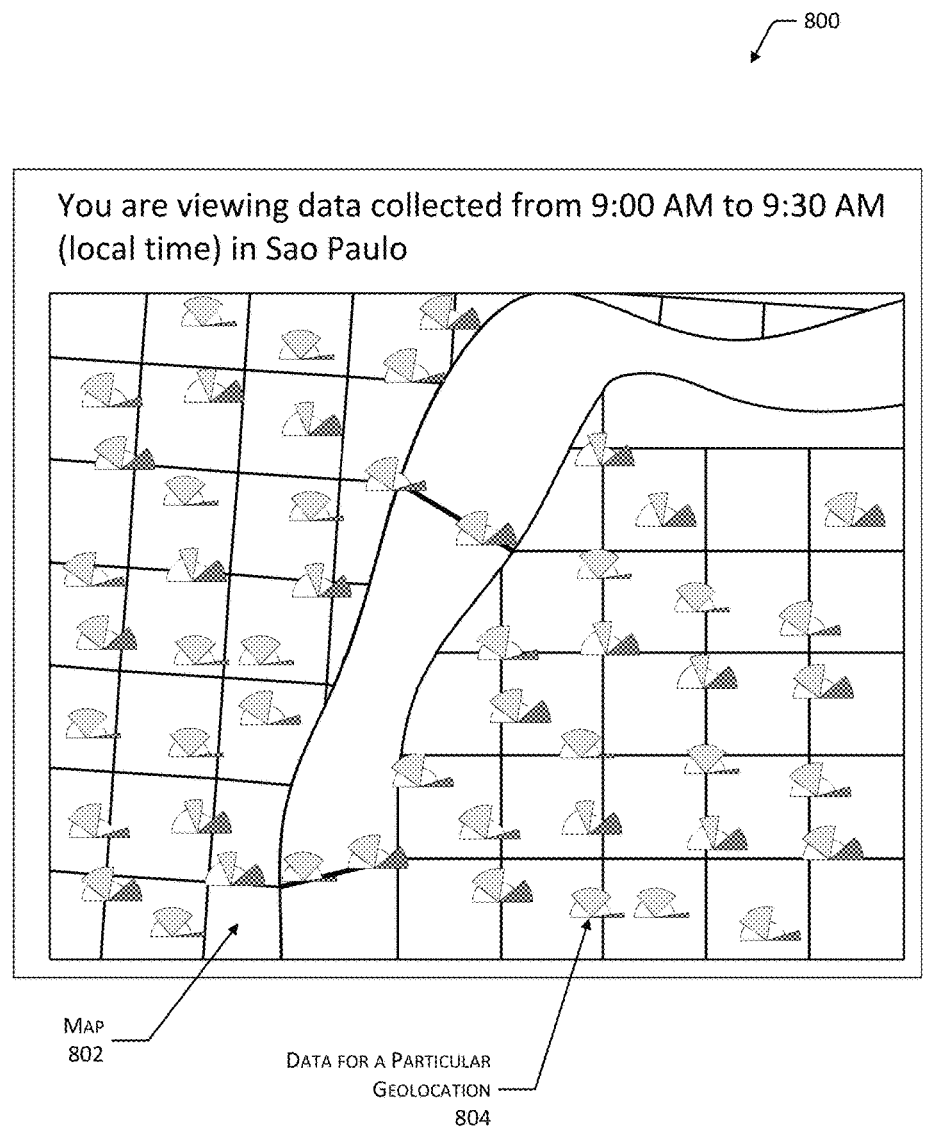
FIG. 8 illustrates a user interface depicting a graphical representation of data acquired by the system, according to one implementation.

FIG. 8 illustrates a user interface 800 depicting a graphical representation of data acquired by the system 100, according to one implementation. For example, the report data 142 may build a graphical representation in a "heat map" style that includes a map 802 and data for particular a geolocation 804. The report data 142 may be based on one or more of the proxy session data 134 or the deployed log data 138.

The graphical representation may be based on log data 132 that is constrained with respect to one or more parameters such as time, geolocation 110, mobile device in use, and so forth. For example, the graphical representation may present information that is collected during a specified interval of time, such as from 9:00 AM to 9:30 AM as depicted here. Continuing the example, the parameters of the graphical representation may also specify a geolocation 110, such as information that was obtained in the city of São Paulo, Brazil.

By placing the data for a particular geolocation 804 at the corresponding location on the map 802, the developer 102 may be able to determine trends or particular problem areas that may affect operation of the AUT 104. For example, the WCDN in a particular portion of the city may not yet to be upgraded and as a result is only capable of supporting 2G connections, while other portions of the city support 4G service. By seeing information such as the type of network connection and the lower throughput and increased latency experienced by those users in a particular portion of the city, the developer 102 may be able to modify the operation the AUT 104 to improve performance under the conditions of the slower network 112 that is available in that portion of the city.

Illustrative Processes

Figure 9:
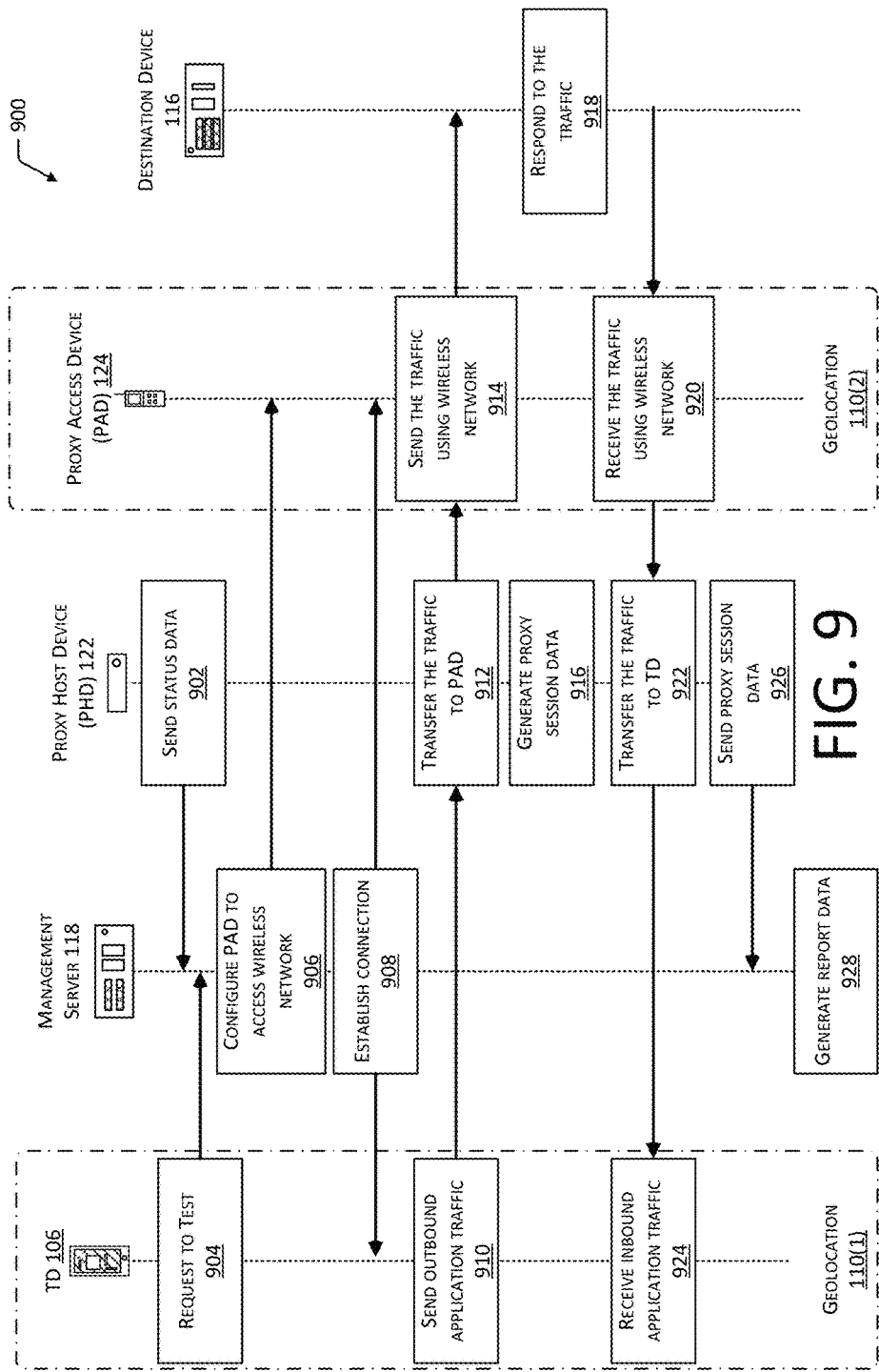
FIG. 9 is a flow diagram of a process for directing traffic from an application under test executing on a test device through a proxy access device and out to a network at another geolocation, according to one implementation.

FIG. 9 is a flow diagram of a process 900 for directing traffic from an AUT 104 executing on a TD 106 through a proxy access device 124 and out to a second network 112(2) at the second geolocation 110(2), according to one implementation.

In this illustration, the TD 106, the management server 118, the proxy host device 122, the proxy access device 124, and the destination device 116 are depicted. In some implementations, one or more of the functions described below may be performed by different devices or combination of devices. The TD 106 is physically located at a first geolocation 110(1). For example, the TD 106 may be at the developer's 102 office in Sacramento, Calif., USA. The proxy access device 124 is physically located at a second geolocation 110(2). For example, the cell phone that is being used as a proxy access device 124 may be located in São Paulo, Brazil.

At 902, the status data 336 is sent from the proxy host device 122 to the management server 118. For example, the status data 336 may indicate that a particular proxy access device 124 is available, the network 112 that is connected thereto, and so forth.

At 904, the TD 106 sends a request to test to the management server 118. For example, the developer 102 may have used the user interface 600 to select São Paulo, Brazil for testing, and the SDK 228 may generate and send the request.

At 906, the proxy access device 124 is configured to access the second network 112(2). For example, the management server 118 may send device configuration data 344 to the proxy host device 122. The proxy host device 122 may then use the device configuration data 344 to prepare the proxy access device 124 for data transfer.

At 908, a connection is established between the AUT 104 and the proxy access device 124. For example, the management server 118 may send to the TD 106 the test configuration data 236 that is indicative of the network address and connection credentials for the proxy host device 122. The TD 106 may then establish a transmission control protocol (TCP) connection with the proxy access device 124.

In some implementations, the connection may comprise a virtual private network (VPN) between the TD 106 and the proxy access device 124. For example, the TD 106 and the proxy access device 124 may establish digital certificates or other cryptographic credentials to authenticate one another and establish an encrypted connection or "tunnel". In some implementations, the traffic sent using the VPN may be unencrypted. For example, the VPN may use unencrypted generic routing encapsulation (GRE) to provide for tunneling between the TD 106 and the proxy access device 124.

At 910, the TD 106 sends outbound application traffic 128 to the proxy host device 122. For example, the SDK 228 may intercept the outbound application traffic 128 and redirect it to the proxy access device 124 by way of the established connection. During testing, the TD 106 may still maintain otherwise normal access to the network 112. For example, the developer 102 may be able to use other applications or modules to access resources on the Internet using the first network 112(1) without hindrance.

The AUT 104 and elements of the SDK 228 may be configured to execute using the typical OS privileges associated with a user. For example, the AUT 104 may execute in the user space, as compared to a kernel space, of the OS module 418. The user space may be associated with fewer privileges within the OS compared to a root account, superuser, administrator, or other types of elevated accounts.

At 912, the proxy host device 122 transfers the outbound application traffic 128 to the proxy access device 124. For example, the outbound application traffic 128 is passed to the proxy access device 124 using the USB I/O interface 510 of the proxy access device 124.

At 914, the proxy access device 124 sends the outbound application traffic 128 to the destination device 116 by way of the second network 112(2). Continuing the example, the outbound application traffic 128 is sent to the destination device 116 using the network interface 512.

At 916, the proxy host device 122 generates the proxy session data 134. For example, the proxy host device 122 may acquire packet capture of the data transfer, or information associated with the data transfer. By collecting the proxy session data 134 at the proxy host device 122, the effects associated with the connection between the TD 106 and the proxy host device 122 may be removed from consideration. Instead, the proxy session data 134 may provide information such as latency as measured from the proxy host device 122 or the proxy access device 124 with respect to the destination device 116.

During testing, the developer 102 may experience the additional latency associated with the communication between the TD 106 and the proxy host device 122. However, this additional latency will not be reflected in the proxy session data 134.

At 918, the destination device 116 responds to the traffic 918. For example, where the outbound application traffic 128 comprises a request for information, the response may be for the destination device 116 to provide the requested information. The destination device 116 sends inbound application traffic 130, such as the response to the proxy access device 124, again by way of second network 112(2).

At 920, the proxy access device 124 receives the inbound application traffic 130. The inbound application traffic 130 is passed to the proxy host device 122 using the USB I/O interface 510.

At 922, the proxy host device 122 transfers the inbound application traffic 130 to the TD 106. For example, the inbound application traffic 130 may be transferred using the first network 112(1).

At 924, the TD 106 receives the inbound application traffic 130. The SDK 228 may pass the inbound application traffic 130 to the rest of the AUT 104. The AUT 104 then processes the inbound application traffic 130 is it otherwise normally would.

At 926, the proxy session data 134 is sent from the proxy host device 122 to the management server 118. In other implementations, an aggregation server or other device may be used to acquire the proxy session data 134, which may then be accessed by the management server 118.

At 928, the management server 118 generates the report data 142 based at least in part on the proxy session data 134.

The developer 102 may then access the report data 142. For example, the report data 142 may be sent to the TD 106, the workstation 108, or another device. By using the techniques described, information about the AUT 104 may be obtained under real-world conditions and real-world usage. In particular, information may be obtained about the operation of the AUT 104 under the network conditions at different geolocations 110. The developer 102 may use this information to improve the overall quality of subsequent versions of AUT 104.

Figure 10:
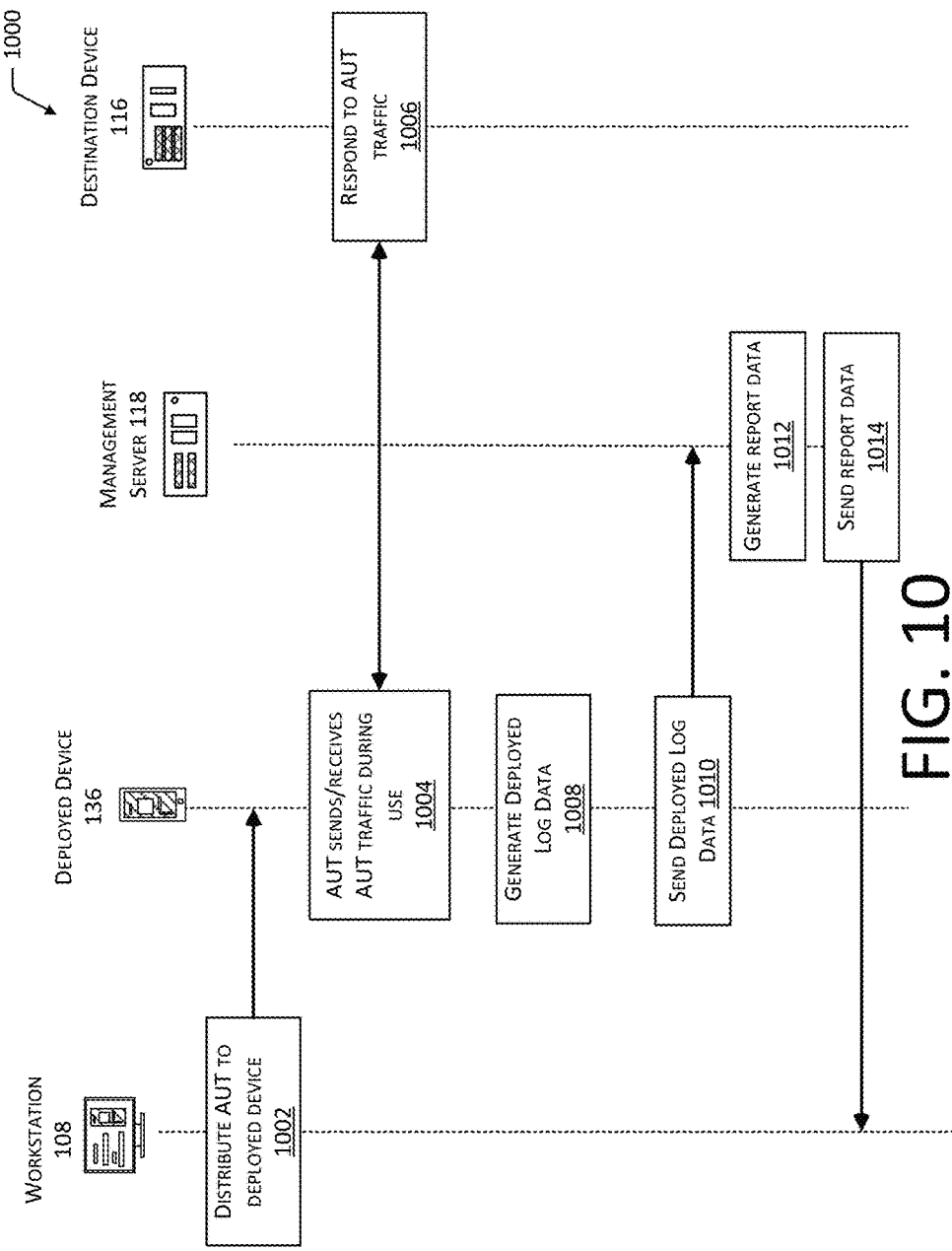
FIG. 10 is a flow diagram of a process for obtaining deployed log data from deployed devices executing the application under test, according to one implementation.

FIG. 10 is a flow diagram of a process 1000 for obtaining deployed log data 138 from deployed devices 136 executing the AUT 104, according to one implementation. In this illustration, the workstation 108, the deployed device 136, the management server 118, and the destination device 116 are depicted. In some implementations, one or more of the functions described below may be performed by different devices or combination of devices.

At 1002, the AUT 104 is distributed to one or more deployed devices 136. For example, the developer 102 may send the AUT 104 to an application distribution server. Users of the deployed devices 136 may then retrieve the AUT 104 from the application distribution server for installation and subsequent use. The AUT 104 may incorporate one or more elements of the SDK 228. In particular, these elements of the SDK 228 may be configured to generate the deployed log data 138 and provide the deployed log data 138 to the management server 118.

At 1004, the AUT 104 at the deployed device 136 sends or receives AUT traffic 114 to the destination device 116 during use of the AUT 104.

At 1006, the destination device 116 responds to the AUT traffic 114. In some implementations, the destination device 116 may send inbound application traffic 130 to the AUT 104 without prior request. For example, the destination device 116 may "push" data to the AUT 104 without earlier communication.

At 1008, deployed log data 138 is generated. For example, the SDK 228 may interrogate the network interface 214 of the deployed device 136 to determine information about the connection to the wireless network 112, may access information indicative of geolocation 110, such as coordinates provided by the positioning device, and so forth.

At 1010, the deployed log data 138 is sent to the management server 118. In some implementations, the deployed log data 138 may be streamed in real time or near real time to the management server 118. For example, the deployed log data 138 may be sent every five seconds to the management server 118.

At 1012, the management server 118 generates the report data 142. For example, as described above, the analysis module 140 may process the log data 132 and generate the report data 142. Continuing the example, the report data 142 may comprise a graphical representation such as depicted in FIG. 8.

At 1014, the management server 118 sends the report data 142 to the workstation 108. For example, the developer 102 may use the user interface provided by the developer interface module 328 to retrieve the report data 142 for a particular interval of time, geolocation 110, and so forth. The developer 102 may then use the report data 142 to make changes to the AUT 104. By using the techniques described, information about the AUT 104 may be obtained under real-world conditions and real-world usage, resulting in improvements in overall quality of subsequent versions of AUT 104.

Figure 11:
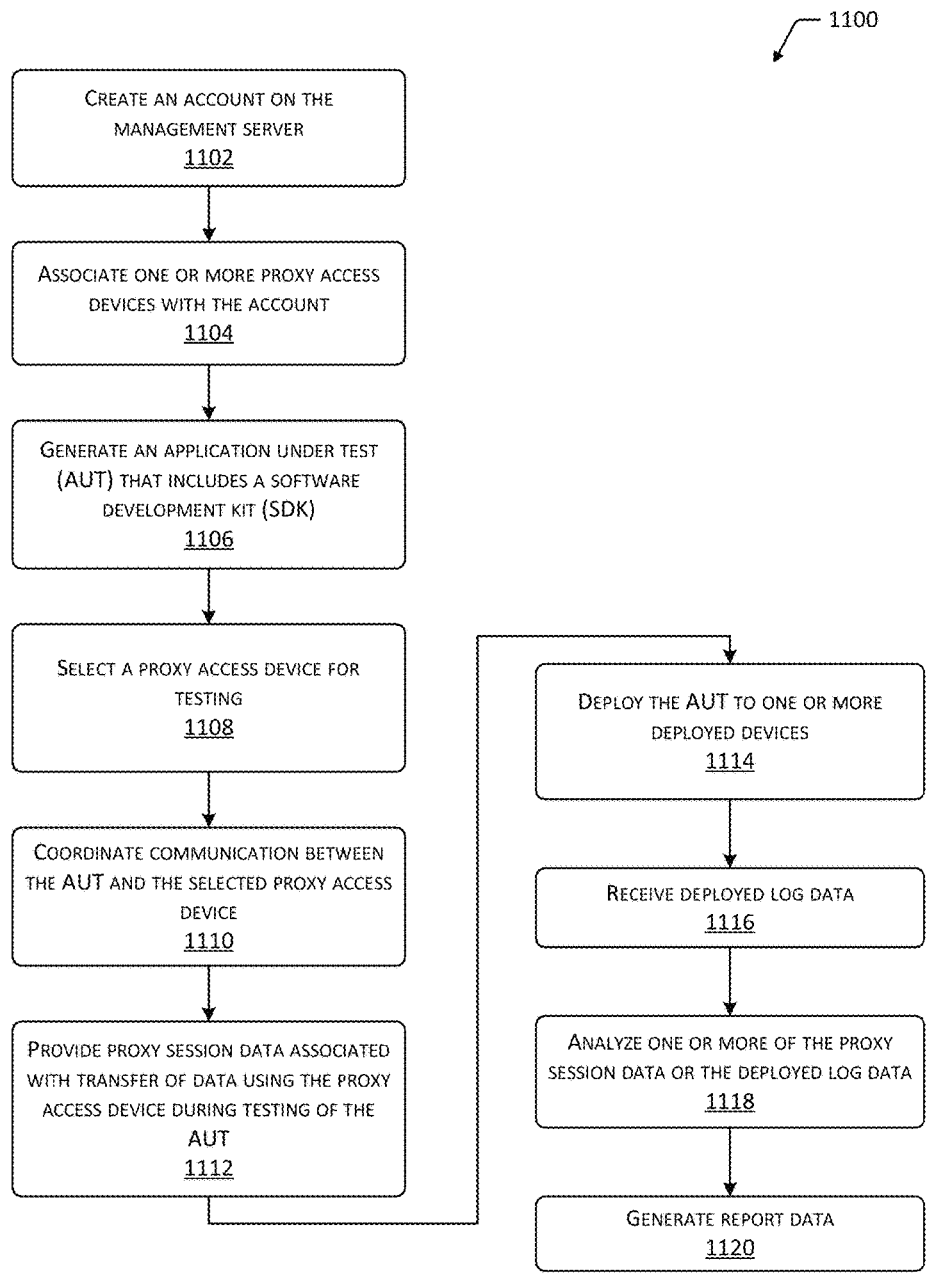
FIG. 11 is a flow diagram of a process for generating report data associated with an application under test, according to one implementation.

FIG. 11 is a flow diagram of a process 1100 for generating report data 142 associated with an AUT 104, according to one implementation. One or more of the functions described below with regard to the process 1100 may be performed at least in part by one or more of the TD 106, the management server 118, the proxy host device 122, or the proxy access device 124.

In this illustration, the workstation 108, the deployed device 136, the management server 118, and the destination device 116 are depicted. In some implementations, one or more of the functions described below may be performed by different devices or combination of devices.

At 1102, an account may be created on the management server 118. For example, the developer 102 may use a user interface to set up an account, specify payment information, set preferences with regard encryption of AUT traffic 114 or report data 142, and so forth.

At 1104, one or more proxy access devices 124 may be associated with the account. For example, the developer 102 may have a colleague set up the proxy host device 122 and the tethered proxy access device 124 at a second geolocation 110(2). In another example, the developer 102 may purchase access to proxy host devices 122 and proxy access devices 124 that are maintained by another entity.

At 1106, the AUT 104 is generated that includes the SDK 228. For example, the SDK 228 or portions thereof may be incorporated into the AUT 104 at compile time.

At 1108, the proxy access device 124 is selected for testing. For example, the user interface 600 may be used by the developer 102 to select the proxy access device 124 at a particular geolocation 110.

At 1110, communication between the AUT 104 and the selected proxy access device 124 is coordinated. For example, the management server 118 may send test configuration data 236 to the AUT 104. The AUT 104 may use the network address and credentials in the test configuration data 236 to establish the first connection with the proxy host device 122 that is in communication with the proxy access device 124.

At 1112, the proxy session data 134 associated with transfer of data during testing of the AUT 104 using the proxy access device 124 is provided. For example, the proxy session data 134 may be provided to the management module 120. The proxy session data 134 may be obtained by the proxy host device 122 as described above.

At 1114, the AUT 104 may be deployed to one or more deployed devices 136. For example, the AUT 104 may be distributed to the deployed devices 136 by way of an application distribution server.

At 1116, the deployed log data 138 is received. For example, the management module 120 of the management server 118 may receive the deployed log data 138 that is being streamed from the deployed devices 136 while the AUT 104 is in use.

At 1118, one or more of the log data 132 or other information may be analyzed. For example, the proxy session data 134 and the deployed log data 138 may be analyzed to determine particular networks 112 on which communication to the destination device 116 exhibits performance below threshold value.

At 1120, report data 142 may be generated. For example, the report data 142 may comprise a graphical representation such as presented in FIG. 8 or tabular data. The report data 142 may be accessed by the developer 102, such as by using an Internet browser executing on the workstation 108 or the TD 106.

Figure 12:
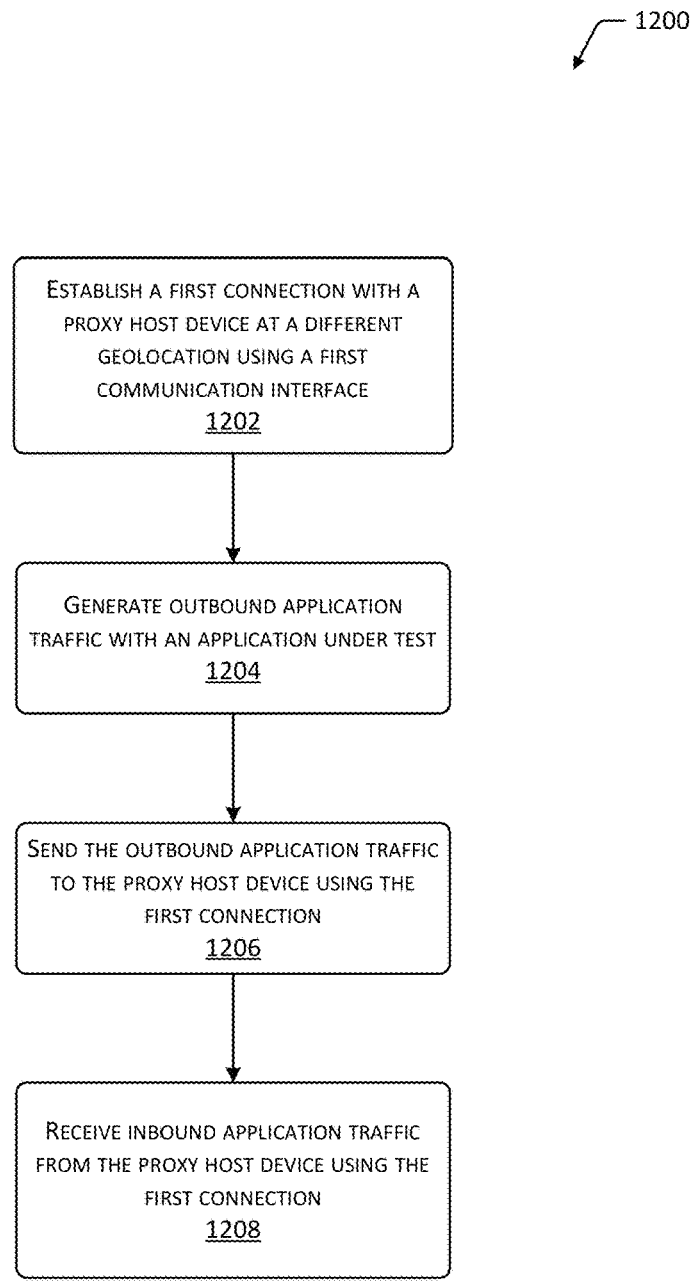
FIG. 12 is a flow diagram of a process for operating a test device during testing of an application under test, according to one implementation.

FIG. 12 is a flow diagram of a process 1200 for operating a TD 106 during testing of an AUT 104, according to one implementation.

At 1202, the TD 106 establishes a first connection with a proxy host device 122 using a first communication interface 210. The TD 106 may be at a first geolocation 110(1) while the proxy host device 122 is at a second geolocation 110(2). For example, the developer 102 using the TD 106 may be in Chicago, Ill., USA, while the proxy host device 122 is in Toronto, Ontario, Canada.

At 1204, outbound application traffic 128 is generated by the AUT 104. For example, the AUT 104 may make a request for information to the destination device 116.

At 1206, the outbound application traffic 128 is sent to the proxy host device 122 using the first connection. For example, one or more instructions in the SDK 228 may direct the outbound application traffic 128 to a particular Internet Protocol (IP) address and port of the proxy host device 122. The proxy host device 122 may in turn pass the outbound application traffic 128 to the proxy access device 124 that is tethered to the proxy host device 122.

At 1208, the inbound application traffic 130 is received from the proxy host device 122 using the first connection. For example, the proxy host device 122 may receive the inbound application traffic 130 from the proxy access device 124 and transfer the inbound application traffic 130 using the first connection to the TD 106.

Figure 13:
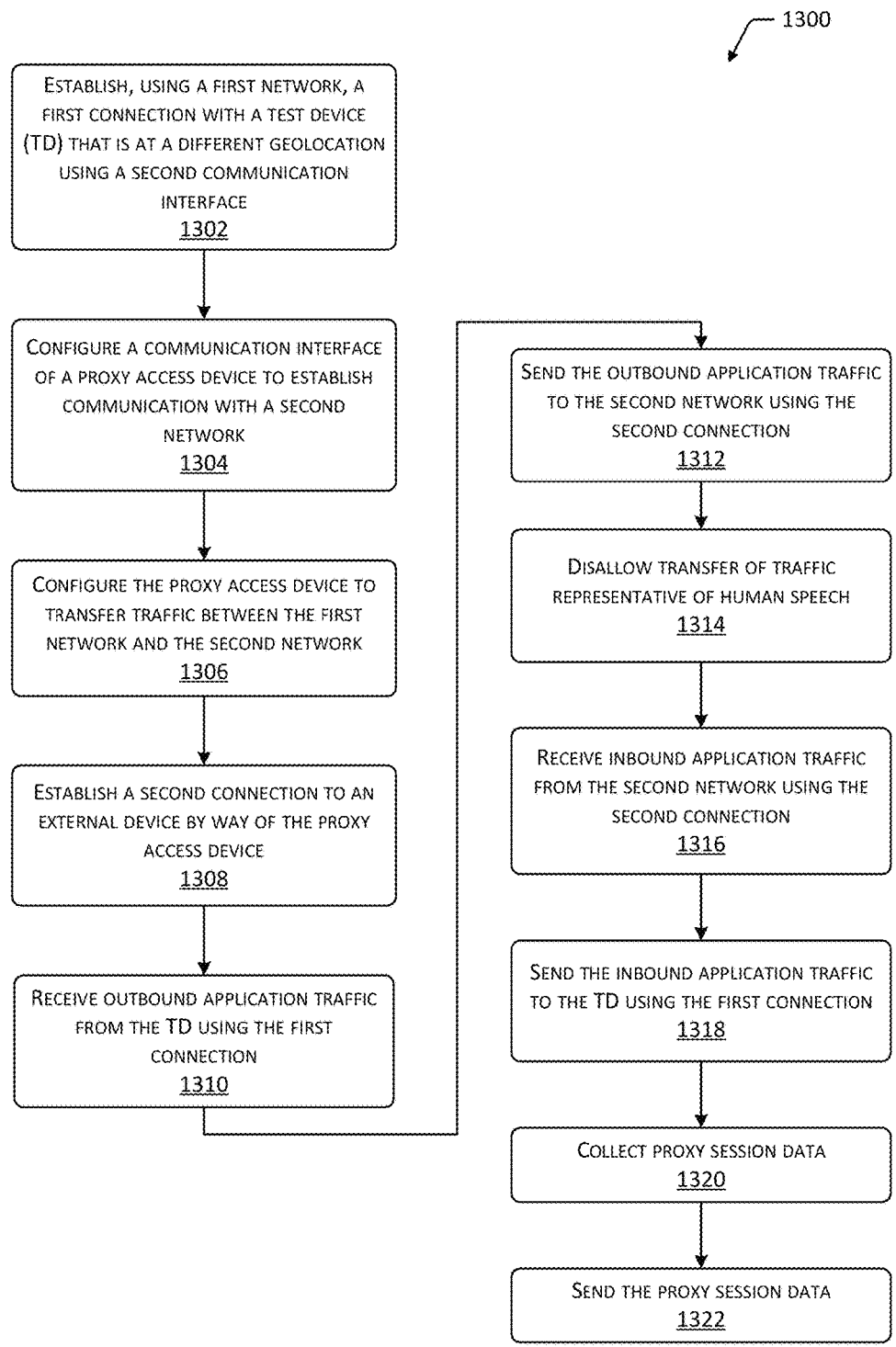
FIG. 13 is a flow diagram of a process for operating a proxy host device, according to one implementation.

FIG. 13 is a flow diagram of a process 1300 for operating a proxy host device 122, according to one implementation.

At 1302, the proxy host device 122 establishes a first connection with the TD 106 using the first network 112(1). For example, the proxy host device 122 may receive a connection request from the TD 106, and may respond to the connection request to open the first connection. The TD 106 may be at a first geolocation 110(1) while the proxy host device 122 is at a second geolocation 110(2). In some implementations the first connection may be implemented as a VPN.

At 1304, a communication interface 508 of the proxy access device 124 that is connected to the proxy host device 122 may be configured to establish communication with the second network 112(2). For example, the proxy host device 122 may provide instructions to the proxy access device 124 that, when processed by the proxy access device 124, establishes a communication session with the network access point 126 and the corresponding second network 112(2) that is accessed thereby.

At 1306, the proxy access device 124 is configured to transfer traffic between the first network 112(1) and the second network 112(2). For example, the proxy access device 124 may be sent instructions that install and execute the local traffic module 526.

At 1308, a second connection to an external device such as the destination device 116 is established by way of the proxy access device 124. For example, the second connection may comprise a TCP session between the proxy access device 124 and the destination device 116. In some implementations, the second connection may be between the proxy host device 122 and the destination device 116 or may be between the proxy access device 122 and the destination device 116.

At 1310, outbound application traffic 128 is received from the TD 106 using the first connection. For example, the outbound application traffic 128 may be received across one of the network interfaces 412 of the proxy host device 122.

At 1312, the outbound application traffic 128 is sent to the second network 112(2) using the second connection. For example, the traffic proxy module 426 may receive the outbound application traffic 128 from the TD 106 and forward the output application traffic 128 to the proxy access device 124 by way of the I/O interfaces 410.

In some implementations, it may be advantageous to prevent the transfer of traffic representative of human speech between the TD 106 and the proxy access device 124. For example, the administrator of the management server 118 may wish to prevent developers 102 from placing telephone calls at the second geolocation 110(2).

At 1314, transfer of traffic representative of human speech may be disallowed. For example, packets that contain header information indicative of voice traffic may be blocked. In another example, IP ports associated with the transfer of voice data may be blocked.

In some implementations, a billing account associated with service provisioned to the proxy access device 124 may allow data traffic on the second network but disallow voice traffic. For example, a billing account for the cellphone used as a proxy access device 124 may pay for, and be provisioned only for, data and not voice traffic. Other types of traffic may be disallowed, or not paid for. For example, short message service (SMS) services may not be provisioned for the billing account of the proxy access device 124.

At 1316, inbound application traffic 130 is received by the proxy host device 122 from the second network 112(2) using the second connection. For example, the inbound application traffic 130 may be transferred from the network access point 126 to the proxy access device 124, and then sent via the I/O interface 410 to the proxy host device 122.

At 1318, the inbound application traffic 130 is sent to the TD 106 using the first connection. For example, the inbound application traffic 130 may be forwarded by the traffic proxy module 426 to the first network 112(1) by way of the network interface 412.

At 1320, proxy session data 134 is collected. For example, the data collection module 428 may capture packets as they are transferred by the proxy host device 122.

At 1322, the proxy session data 134 may be sent to another device. For example, the proxy host device 122 may send the proxy session data 134 to the management server 118.

In one implementation, the proxy host device 122 may not have access to the first network 112(1). In this implementation, the proxy host device 122 may utilize the second network 112(2) for connectivity.

Figure 14:
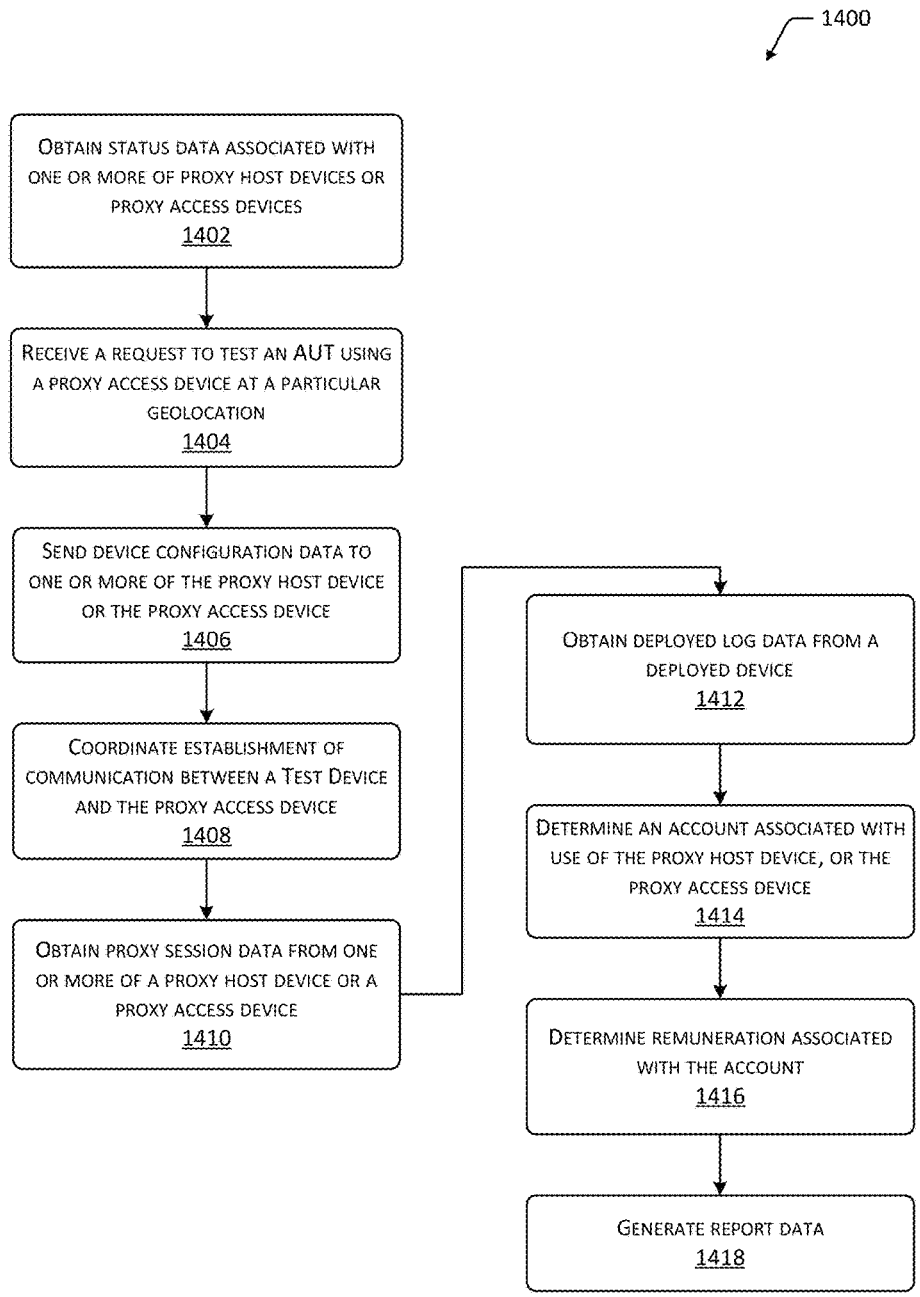
FIG. 14 is a flow diagram of a process for operating a management server, according to one implementation.

FIG. 14 is a flow diagram of a process 1400 for operating a management server 118, according to one implementation.

At 1402 status data 336 associated with one or more of the proxy host devices 122 or the proxy access devices 124 is obtained. For example, the status data 336 may be indicative of a particular proxy access device 124 at the second geolocation 110(2) and on the second network 112(2) that is ready to be used for testing.

At 1404, the management server 118 receives a request to test the AUT 104 using a proxy access device 124 at a particular geolocation 110. For example, the developer 102 may use the user interface 600 to pick a particular geolocation 110.

At 1406, device configuration data 344 is sent to one or more of the proxy host device 122 or the proxy access device 124. The device configuration data 344 may be customized to the attributes of the proxy host device 122, the proxy access device 124, or both. For example, the device configuration data 344 may comprise instructions that are executable for a particular operating system that the proxy host device 122 is using.

At 1408, the management server 118 coordinates establishment of communication between the TD 106 and the proxy access device 124. For example, the management server 118 may send test configuration data 236 to the TD 106 that includes a network address and connection credentials for the proxy host device 122 to which the proxy access device 124 is tethered. The TD 106 may use the test configuration data 236 to establish a connection.

At 1410, proxy session data 134 is obtained. For example, the proxy host device 122 may collect and send the proxy session data 134 to the management server 118. In another example, the proxy session data 134 may be collected by the proxy access device 124. Once collected, proxy session data 134 may be sent to the proxy host device 122 and then on to the management server 118.

In some implementations, the management server 118 may also be used to obtain information from the AUT 104 that is executed by one or more deployed devices 136. At 1412, the deployed log data 138 may be obtained from one or more of the deployed devices 136. As described above, the deployed devices 136 may send the deployed log data 138 to the management server 118.

In some situations, an owner or operator of the proxy host device 122 or the proxy access device 124 may receive remuneration for the use of their hardware, network access service, and so forth. For example, a rental entity may setup and maintain a proxy host device 122 and connect to it several proxy access devices 124.

At 1414, a rental account associated with the use of one or more of the proxy host device 122 or the proxy access device 124 may be determined. For example, an account associated with the rental entity may be looked up after receiving status data 336.

At 1416, an amount of remuneration associated with the rental account may be determined and subsequently provided. For example, usage information such as quantity of data transferred, amount of time used, premium associated with particular types of proxy access devices 124, and so forth, may be used to calculate the cost associated with the use the proxy access device 124.

Once determined, the remuneration may be provided to the rental entity. For example, an account associated with the developer 102 that is using the equipment provided by the rental entity may be debited, and an account associated with the rental entity may be credited in the amount of the remuneration.

At 1418, the management server 118 may generate report data 142. As described above, the analysis module 140 may generate the report data 142 based at least in part on the log data 132. In some implementations, the report data 142 may also include information indicative of the cost associated with the use of the system 100. For example, the report data 142 may indicate the cost of the remuneration provided to the rental entity.

Figure 15:
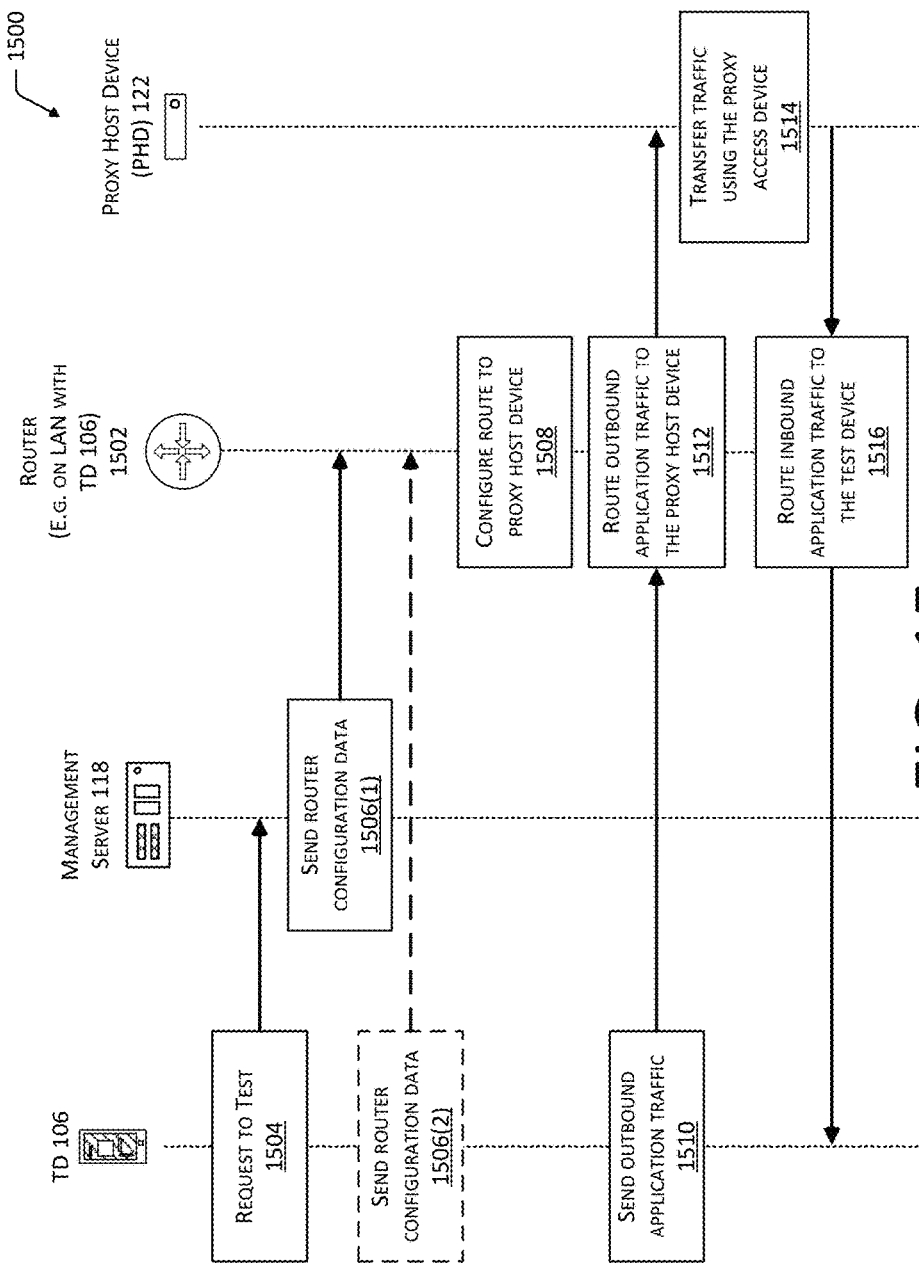
FIG. 15 is a flow diagram of a process for directing traffic to the proxy host device, according to one implementation.

FIG. 15 is a flow diagram 1500 of a process for directing traffic to the proxy host device 122, according to one implementation. Instead of the AUT 104 redirecting the AUT traffic 114, in the implementation depicted here a router on the first network 112(1) is configured and used as a transparent proxy. The AUT 104 may be unaware of the redirection by the router.

A router 1502 is located in a network path on the network 112 between the TD 106 or workstation 108 executing the AUT 104 and the proxy host device 122. For example, the router 1502 may comprise a gateway on a local area network which the TD 106 is connected to.

At 1504 the TD 106 sends a request to test to the management server 118. For example, the developer 102 may have used the user interface 600 to select São Paulo, Brazil for testing, and the SDK 228 may generate and send the request.

At 1506 router configuration data is sent to the router 1502. For example, the router configuration data may comprise instructions to add an entry to a router table that directs traffic from a particular network address, media access control (MAC) address, and so forth to a particular destination network address. In some implementations, the router configuration data may include or be associated with credentials, digital certificates, and so forth to provide for authentication, encryption, and so forth to protect the router 1502 from unauthorized access.

In one implementation shown at 1506(1), the management server 118 sends the router configuration data to the router 1502. In another implementation shown at 1506(2), the TD 106 (or another device) sends the router configuration data to the router 1502. In other implementations, other devices may send the router configuration data or a portion thereof to the router 1502.

At 1508, a route to the proxy host device 122 is configured on the router 1502. For example, the router configuration data may be processed by the router 1502 and the routing table of the router 1502 may be updated to direct traffic from a particular MAC address or source IP address to the address of the proxy host device 122 at the second geolocation 110(2).

At 1510 outbound application traffic 128 is sent from the AUT 104 to the router 1502.

At 1512, the router 1502 routes the outbound application traffic 128 to the proxy host device 122 in accordance with the router configuration data. For example, the outbound application traffic 128 may be re-addressed to a new destination network address that is associated with the proxy host device 122.

At 1514 the proxy host device 122 transfers the AUT traffic 114 between the first network 112(1) and the second network 112(2) using the proxy access device 124. For example, the outbound application traffic 128 may be sent to the destination device 116 using the second network 112(2) and inbound application traffic 130 may be received from the destination device 116 using the first network 112(1).

At 1516, the router 1502 routes the inbound application traffic 130 as received from the proxy host device 122 to the TD 106.

While the redirection is described as a router, the redirection may be implemented on other devices that process traffic on the network 112. For example, a load balancer, firewall, or other network device may be configured to redirect the traffic.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a test device (TD) at a first geolocation, comprising:
      a first communication interface to connect to a first network;
      one or more memories storing first computer-executable instructions; and
      one or more hardware processors to execute the instructions with privileges of a first user account, further wherein the first user account has privileges lesser than a root account, to:
         establish a first connection with a proxy host device at a second geolocation using the first communication interface;
         generate outbound traffic destined for an external device;
         send the outbound traffic to the proxy host device using the first connection; and
         receive inbound traffic from the external device via the proxy host device using the first connection.

2. The system of claim 1, further comprising:
   the proxy host device at the second geolocation, comprising:
      a second communication interface to connect to the first network;
      a third communication interface to connect to a proxy access device, wherein a fourth communication interface of the proxy access device is configurable to connect to a second network;
      one or more memories storing second computer-executable instructions; and
      the one or more hardware processors to execute the second computer-executable instructions to:
         establish the first connection with the TD using the second communication interface;
         establish, using the third communication interface and via the proxy access device, a second connection to the external device using the second network;
         receive the outbound traffic from the TD using the first connection;
         send the outbound traffic to the second network using the second connection;
         receive the inbound traffic from the second network using the second connection; and
         send the inbound traffic to the TD using the first connection.

3. The system of claim 2, the second computer executable instructions further comprising computer-executable instructions to:
   collect proxy session data associated with use of the second network, wherein the proxy session data includes one or more of:
      at least a portion of data transferred between the TD and the external device on the second network, or
      information associated with the second connection.

4. The system of claim 2, the second computer executable instructions further comprising computer-executable instructions to:
   send, using the third communication interface, instructions to the proxy access device to discontinue execution of one or more applications by the proxy access device; and
   wherein the second network comprises a wireless cellular data network.

5. The system of claim 2, further comprising the proxy access device, the proxy access device comprising:
   the fourth communication interface to connect to the third communication interface of the proxy host device;
   a fifth communication interface to connect to the second network;
   one or more memories storing third computer-executable instructions; and
   the one or more hardware processors to execute, with privileges of the first user account having privileges lesser than the root account, instructions to:
      establish the second connection to the external device using the fourth communication interface;
      receive the outbound traffic from the TD using the first connection;
      send the outbound traffic to the second network using the second connection;
      receive the inbound traffic from the second network using the second connection; and
      send the inbound traffic to the TD using the first connection.

6. The system of claim 2, the second computer executable instructions further comprising computer-executable instructions to:
   configure the proxy access device to establish communication with the second network; and
   configure the proxy access device to transfer traffic to and from the second network.

7. The system of claim 1, wherein the proxy host device disallows transfer of traffic representative of human speech.

8. The system of claim 1, further comprising:
   a proxy access device at the second geolocation that is connected to the proxy host device, wherein the proxy access device employs a first subscriber identity module (SIM) to access a second network.

9. A proxy host device comprising:
   a first communication interface to connect to a first network, at a first location;
   a second communication interface to connect to a proxy access device;
   one or more memories storing computer-executable instructions; and
   one or more hardware processors to execute the computer-executable instructions to:
   receive authorization data indicative of authorization of the proxy access device being available for rental use;
   responsive to the authorization data, establish communication with a test device (TD) at a second location using the first communication interface;
   establish communication with one or more wireless cellular data networks using the proxy access device connected to the second communication interface;
   transfer traffic between the TD and the proxy access device; and generate remuneration data indicative of use of the proxy access device by the TD.

10. The proxy host device of claim 9, the computer executable instructions further comprising computer-executable instructions to:
configure the proxy access device to establish communication with the one or more of the one or more wireless cellular data networks; and
configure the proxy access device to transfer the traffic to and from the one or more wireless cellular data networks.

11. The proxy host device of claim 9, the computer executable instructions further comprising computer-executable instructions to:
collect log data that includes one or more of:
at least a portion of the traffic, or
information associated with the one or more wireless cellular data networks.

12. The proxy host device of claim 9, wherein the first communication interface comprises a wireless local area network communication interface and the second communication interface comprises a wired communication interface.

13. The proxy host device of claim 9, the computer executable instructions further comprising computer-executable instructions to:
block cellular telephone call data between the TD and the proxy access device.

14. A system comprising:
a device, the device comprising:
a first communication interface to connect to a first network;
a second communication interface to connect to a second network;
one or more memories storing first computer-executable instructions; and
one or more hardware processors to execute the first computer-executable instructions to:
receive configuration data indicative of a network path between a test device (TD) and a proxy host device (PHD);
generate routing instructions configured to direct traffic between the TD and the PHD;
receive outbound traffic originating from the TD and destined for an external device;
send the outbound traffic to the PHD;
receive inbound traffic from the PHD;
send the inbound traffic to the TD; and
wherein the TD is at a first geolocation and the device is at a second geolocation, and further wherein the TD communicates with the external device via a wireless cellular data network.

15. The system of claim 14, further comprising:
a management server, the management server comprising:
a third communication interface to connect to the device;
one or more memories storing second computer-executable instructions; and
one or more hardware processors to execute the second computer-executable instructions to:
receive a request for a test session using a proxy access device (PAD);
determine the PHD has an available PAD;
generate the configuration data; and
send the configuration data to the device.

16. The system of claim 14, the TD further comprising:
one or more memories storing second computer-executable instructions; and
one or more hardware processors to execute the second computer-executable instructions to:
generate the configuration data; and
send the configuration data to the device.

17. The system of claim 14, wherein the device comprises one or more of a router, load balancer, or firewall.

18. The system of claim 14, further comprising:
a management server, the management server comprising:
a third communication interface to connect to one or more of the device or the proxy host device;
one or more memories storing second computer-executable instructions; and
one or more hardware processors to execute the second computer-executable instructions to:
collect log data that includes data indicative of one or more of:
at least a portion of one or more of the outbound traffic or the inbound traffic; or
information associated with the wireless cellular data network.

19. The system of claim 14, further comprising:
a management server, the management server comprising:
a third communication interface to connect to the device;
one or more memories storing second computer-executable instructions; and
one or more hardware processors to execute the second computer-executable instructions to:
receive, from one or more of an owner or operator of the device data indicative of approval to use the device;
determine an account associated with the use of the device; and
determine, based at least in part on use of the device, an amount of remuneration that is associated with the account.

* * * * *